(12) United States Patent
Torii et al.

(10) Patent No.: US 10,245,977 B2
(45) Date of Patent: Apr. 2, 2019

(54) ARMREST CONTROL DEVICE AND ARMREST DEVICE

(71) Applicant: FUJI JUKOGYO KABUSHIKI KAISHA, Tokyo (JP)

(72) Inventors: Takeshi Torii, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 17 days.

(21) Appl. No.: 15/350,235

(22) Filed: Nov. 14, 2016

(65) Prior Publication Data

US 2017/0144568 A1    May 25, 2017

(30) Foreign Application Priority Data

Nov. 24, 2015    (JP) .................................. 2015-228686

(51) Int. Cl.
*B60N 2/75* (2018.01)
*B60N 2/02* (2006.01)

(52) U.S. Cl.
CPC ........... *B60N 2/0244* (2013.01); *B60N 2/767* (2018.02); *B60N 2/77* (2018.02); *B60N 2002/0268* (2013.01)

(58) Field of Classification Search
CPC ........... B60W 40/08; B60N 2/02; B60Q 9/00; B62D 1/183
USPC ........................................................ 701/23
See application file for complete search history.

(56) References Cited

U.S. PATENT DOCUMENTS

| 9,908,440 | B2 * | 3/2018 | Sugioka | ................ B60R 16/037 |
| 2010/0308166 | A1 * | 12/2010 | Bovelli | .................. B64D 11/06 244/122 B |
| 2015/0142246 | A1 * | 5/2015 | Cuddihy | ................ B62D 1/183 701/23 |
| 2016/0001781 | A1 * | 1/2016 | Fung | ...................... B60W 40/08 701/36 |
| 2016/0159251 | A1 * | 6/2016 | Ebina | ................... B60N 2/0244 701/49 |
| 2016/0318442 | A1 * | 11/2016 | James | ....................... B60Q 9/00 |
| 2017/0101032 | A1 * | 4/2017 | Sugioka | ................ B60N 2/763 |
| 2017/0291544 | A1 * | 10/2017 | Ishihara | ................... B60Q 9/00 |

(Continued)

FOREIGN PATENT DOCUMENTS

| GB | 2520842 A | 6/2015 |
| JP | 2009-255778 A | 11/2009 |

(Continued)

OTHER PUBLICATIONS

Office Action for JP Patent Application No. 2017-145773, dated Jun. 5, 2018, 3 pages of Office Action and 3 pages of English Translation.

*Primary Examiner* — Thomas G Black
*Assistant Examiner* — Wae L Louie
(74) *Attorney, Agent, or Firm* — Chip Law Group

(57) ABSTRACT

An armrest control device includes a driving mode determiner that determines a switching state of a driving mode of a vehicle capable of switching between an automatic driving mode and a manual driving mode, and an armrest controller that moves a supporter, which supports an arm of a driver of an armrest, so that the supporter approaches a steering wheel, when the driving mode determiner determines that a switching from the automatic driving mode to the manual driving mode has started.

16 Claims, 19 Drawing Sheets

(56) References Cited

U.S. PATENT DOCUMENTS

| | | | |
|---|---|---|---|
| 2017/0341678 A1* | 11/2017 | Dekker | B62D 1/04 |
| 2017/0347518 A1* | 12/2017 | Brooks | A01B 63/026 |
| 2018/0022358 A1* | 1/2018 | Fung | B60W 40/08 |
| | | | 701/36 |
| 2018/0029501 A1* | 2/2018 | Wolf | B60N 2/06 |
| 2018/0056750 A1* | 3/2018 | Freese | B60H 1/00828 |

FOREIGN PATENT DOCUMENTS

| | | |
|---|---|---|
| JP | 2011-148383 A | 8/2011 |
| WO | 2015/011866 A1 | 1/2015 |

\* cited by examiner

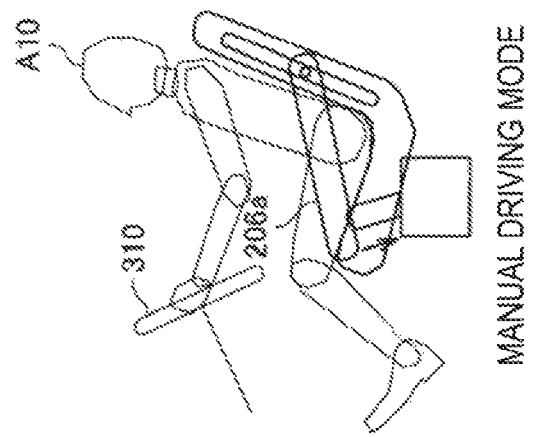
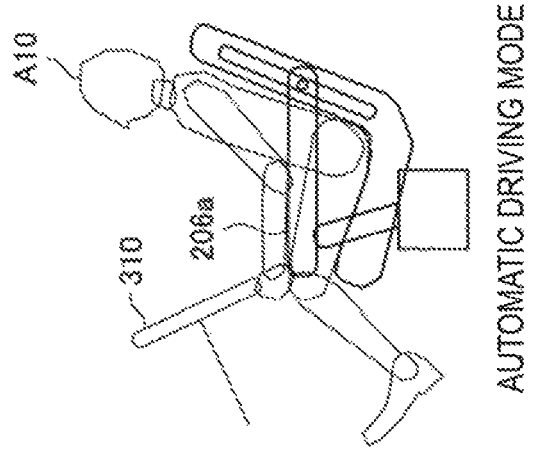
FIG. 10

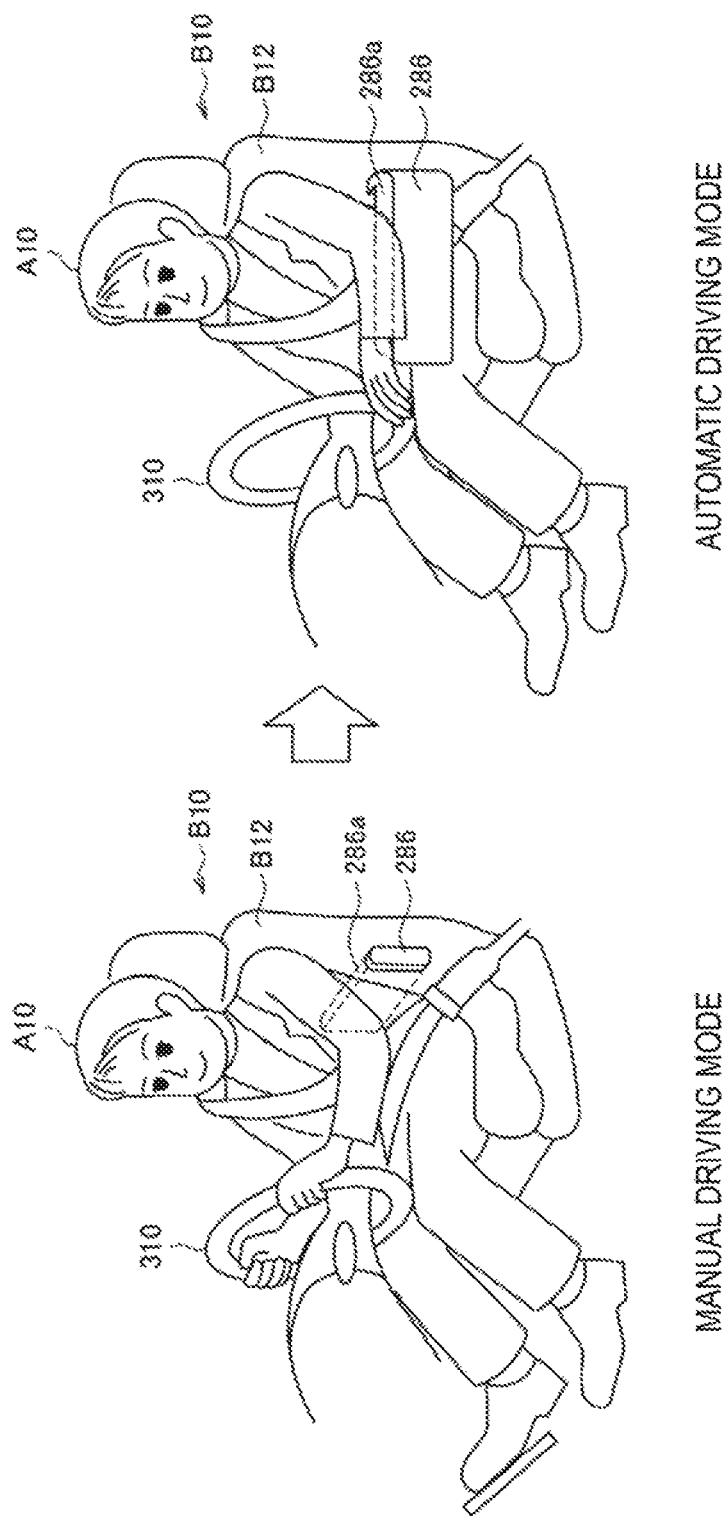

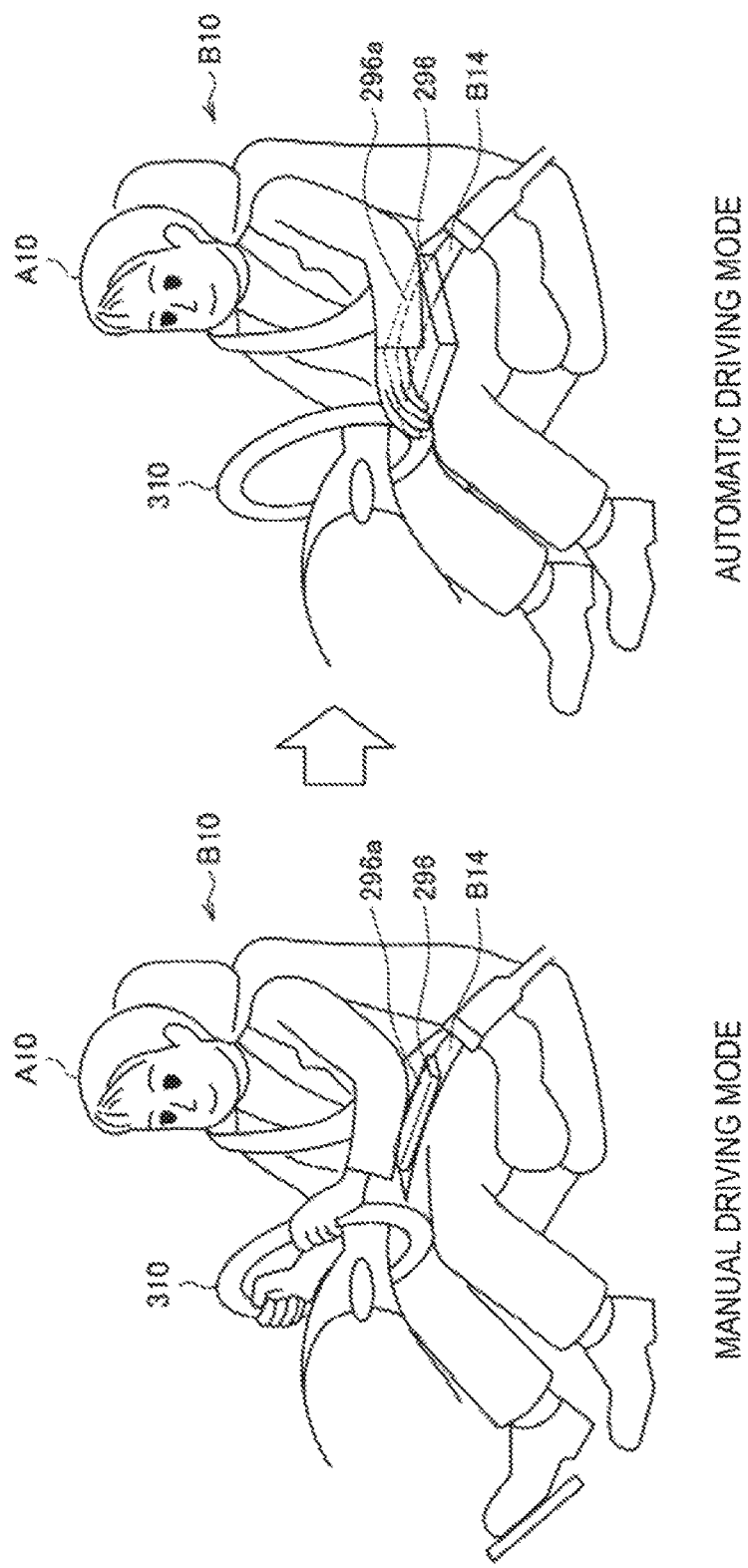

ARMREST CONTROL DEVICE AND ARMREST DEVICE

CROSS-REFERENCE TO RELATED APPLICATIONS

The present application claims priority from Japanese Patent Application No. 2015-228686 filed on Nov. 24, 2015, the entire contents of which are hereby incorporated by reference.

BACKGROUND

1. Technical Field

The present invention relates to an armrest control device and an armrest device.

2. Related Art

Conventionally, techniques of adjusting a position of an armrest are known. In the adjustment of a position of an armrest, techniques relate to the adjustment of a position of an armrest according to various conditions are proposed.

For example, Japanese Unexamined Patent Application Publication No. 2011-148383 discloses a technique, in which reaction force that an armrest gives to an upper arm or an elbow is adjusted by changing a position of an armrest on the basis of vehicle speed and a yaw rate of the vehicle, for reducing fatigue of a driver in various driving situations.

Incidentally, in recent years, a vehicle capable of traveling in an automatic driving mode that allows the vehicle to travel automatically not depending on operations such as a steering operation, accelerator operation and brake operation of a driver is proposed. Such a vehicle does not always travel in the automatic driving mode, but also travels in a manual driving mode in which the vehicle travels on the basis of various operations of a driver, and switching between the automatic driving mode and the manual driving mode is made possible.

In the manual driving mode, a driver must perform steering operations. On the other hand, in the automatic driving mode, since a driver does not have to grip a steering, it is considered that the position of an armrest is adjusted to a position corresponding to a comfortable posture to be set as a posture of a driver in the automatic driving mode for reducing the fatigue of the driver. Hereby, the driver can place an arm on the armrest, and take a comfortable posture. Here, when a switching from the automatic driving mode to the manual driving mode is performed, the driver must grip the steering at the time point when the switching to the manual driving is completed. Therefore, it is expected to actualize a smooth transition of the posture of the driver before and after the switching of the driving mode by prompting the grip of the steering by the driver, in the switching from the automatic driving mode to the manual driving mode.

SUMMARY OF THE INVENTION

Accordingly, it is desirable to provide an armrest control device and an armrest device capable of prompting the grip of a steering by a driver when a switching from the automatic driving mode to the manual driving is performed, in a vehicle capable of the switching between the automatic driving mode and manual driving mode.

An aspect of the present invention provides an armrest control device, including: a driving mode determiner that determines a switching state of a driving mode of a vehicle capable of switching between an automatic driving mode and a manual driving mode; and an armrest controller that moves a supporter, which supports an arm of a driver of an armrest, so that the supporter approaches a steering wheel, when the driving mode determiner determines that a switching from the automatic driving mode to the manual driving mode has started.

A driver gripping state determiner that determines a gripping state of an object by the driver may be included. The armrest controller may move the supporter so that the supporter recedes from the steering wheel, in a case where the driver gripping state determiner determines that the driver grips the steering wheel when it is determined that a switching from the automatic driving mode to the manual driving mode has started.

A notification controller that controls notification of various kinds of information to the driver by a notification device may be included. The armrest controller may keep a position of the supporter and the notification controller may cause the notification device to notify information indicating that a switching to the manual driving mode is being performed, in a case where the driver gripping state determiner determines that both hands of the driver grip an object different from the steering wheel when it is determined that a switching from the automatic driving mode to the manual driving mode has started.

The armrest controller may move, in a case where the driver gripping state determiner determines that one hand of the driver grips an object different from the steering wheel and the other hand does not grip an object different from the steering wheel when it is determined that a switching from the automatic driving mode to the manual driving mode has started, a part supporting the other hand in the supporter so that the part approaches the steering wheel.

The armrest controller may move the supporter so that the supporter recedes from the steering wheel when the driving mode determiner determines that a switching from the automatic driving mode to the manual driving mode has started in accordance with input of the driver.

A driver steering forecaster that forecasts whether prescribed steering by the driver will be performed may be included. The armrest controller may move the supporter so that the supporter recedes from the steering wheel by contracting the armrest when the driver steering forecaster forecasts that the prescribed steering by the driver will be performed.

A driver awakening degree determiner that determines whether an awakening degree of the driver is in a deteriorated state may be included. The armrest controller may reciprocate the supporter in a case where the driver awakening degree determiner determines that the awakening degree of the driver is in a deteriorated state.

The armrest controller may move the supporter to a position corresponding to a comfortable posture set as a posture of the driver in the automatic driving mode when the driving mode determiner determines that a switching from the manual driving mode to the automatic driving mode has started.

Another aspect of the present invention provides an armrest device, including: a control device that includes a driving mode determiner that determines a switching state of a driving mode of a vehicle capable of switching between an automatic driving mode and a manual driving mode, and an armrest controller that moves a supporter, which supports an arm of a driver of an armrest, so that the supporter approaches a steering wheel when the driving mode determiner determines that a switching from the automatic driving mode to the manual driving mode has started; and an armrest in which a position of the supporter is adjusted on the basis of an operation instruction from the control device.

BRIEF DESCRIPTION OF THE DRAWINGS

FIG. 10 is an explanatory view for explaining an example of position adjustment of the armrest by the first processing in a switching from the automatic driving mode to the manual driving mode performed by the control device according to the implementation;

FIG. 18 is an explanatory view illustrating an example of a setting position of an armrest device according to another implementation; and FIG. 19 is an explanatory view illustrating an example of a setting position of an armrest device according to another implementation.

DETAILED DESCRIPTION

Figure 1:
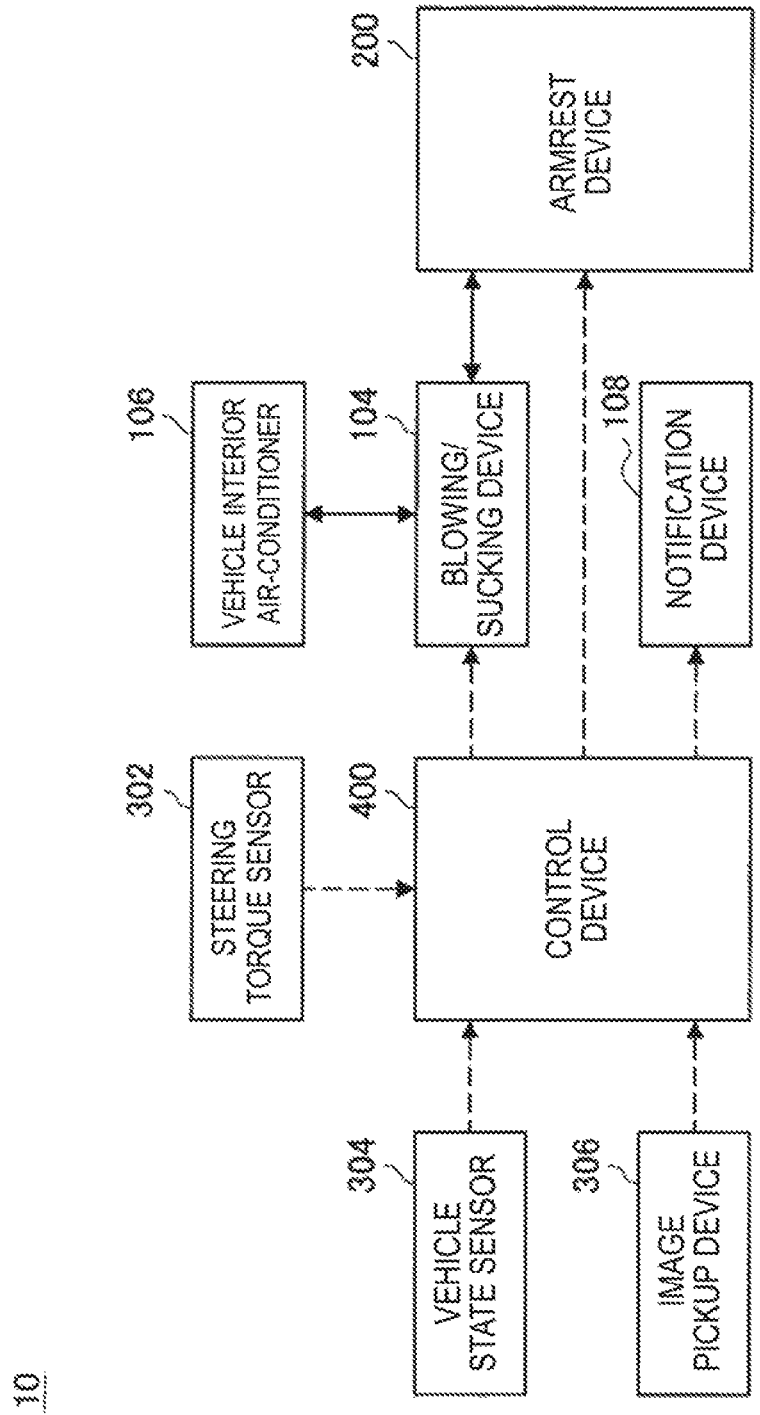
FIG. 1 is a schematic view illustrating an example of a rough configuration of an armrest control system according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

1. CONFIGURATION OF ARMREST CONTROL SYSTEM

First, with reference to FIGS. 1 to 4, a rough configuration of an armrest control system 10 of a vehicle according to an implementation of the present invention will be described. FIG. 1 is a schematic view illustrating an example of a rough configuration of the armrest control system 10 according to the implementation. As illustrated in FIG. 1, the armrest control system 10 includes a blowing/sucking device 104, a vehicle interior air-conditioner 106, a notification device 108, an armrest device 200, a steering torque sensor 302, a vehicle state sensor 304, an image pickup device 306, and a control device 400. The armrest control system 10 according to the implementation may be applied to vehicles capable of switching between an automatic driving mode and a manual driving mode.

The blowing/sucking device 104 supplies the air to various devices of a vehicle and sucks the air from various devices of the vehicle. The blowing/sucking device 104 is coupled to each of the vehicle interior air-conditioner 106 and the armrest device 200 via a ventilation flue through which the air can pass. As a result of supply of the air to the vehicle interior air-conditioner 106 by the blowing/sucking device 104, air conditioning in the vehicle interior is performed by the vehicle interior air-conditioner 106. Further, as a result of supply of the air to the armrest device 200 or suction of the air from the armrest device 200 by the blowing/sucking device 104, the air pressure inside the armrest of the armrest device 200 is kept to a pressure at a level capable of supporting an arm of a diver. Meanwhile, details of the armrest device 200 will be described later. In the supply of the air to the armrest device 200 and the suction of the air from the armrest device 200, the blowing/sucking device 104 is driven on the basis of an operation instruction from the control device 400.

The blowing/sucking device 104 takes in the air from the vehicle exterior or the vehicle interior, and supplies the air having been taken in to each of the vehicle interior air-conditioner 106 and the armrest device 200. Further, the air sucked from the armrest device 200 is sent to the vehicle exterior or the vehicle interior. Meanwhile, the blowing/sucking device 104 may be integrally configured with the vehicle interior air-conditioner 106 or the armrest device 200.

The vehicle interior air-conditioner 106 performs air conditioning of the vehicle interior by sending the air supplied from the blowing/sucking device 104 into the vehicle interior. Concretely, the vehicle interior air-conditioner 106 may perform air conditioning in the vehicle interior by controlling at least one of temperature, direction and flow rate of the air to be sent into the vehicle interior.

The notification device 108 notifies a driver of various kinds of information. For example, the notification device 108 notifies a driver of various kinds of information by displaying various scenes. A function of displaying a scene is actualized, for example, by a CRT (Cathode Ray Tube) display device, a liquid crystal display (LCD) device or an OLED (Organic Light Emitting Diode) device. Further, the notification device 108 may notify a driver of various kinds of information by outputting sounds. A function of outputting a sound is actualized, for example, by a speaker or a handset. Further, the notification device 108 may notify a driver of various kinds of information by generating vibrations. A function of generating vibrations is actualized, for example, by a vibrator. Notification of various kinds of information to a driver by the notification device 108 is performed on the basis of an operation instruction from the control device 400.

The armrest device 200 includes an armrest that supports an arm of a driver, and adjusts a position of the armrest on the basis of an operation instruction from the control device 400. As a result of the adjustment of the position of the armrest by the armrest device 200, a position of the supporter of the armrest, which supports an arm of a driver, is adjusted. Hereinafter, details of the configuration of the armrest device 200 will be described with reference to FIGS. 2 to 4.

Figure 2:
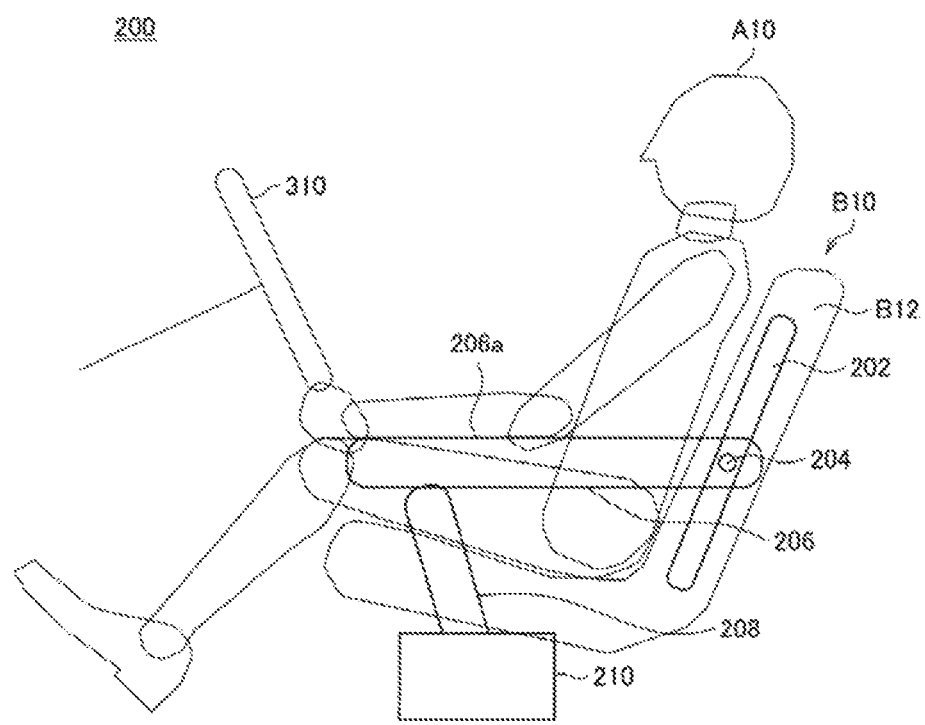
FIG. 2 is an explanatory view illustrating an example of a configuration of an armrest device according to the implementation.

FIG. 2 is an explanatory view illustrating an example of the configuration of the armrest device 200 according to the implementation. As illustrated in FIG. 2, the armrest device 200 includes a hinge guide rail 202, a hinge 204, an armrest 206, an armrest pillar 208, and an armrest pillar expansion/contraction device 210.

The armrest 206 is equipped on a side of a seat B10 of a driver A10, for which a steering wheel 310 is equipped ahead, and is used for supporting an arm of the driver A10. The upper surface of the armrest 206 may correspond to a supporter 206a that supports an arm of the driver A10. The back end of the armrest 206 is coupled to the hinge 204 equipped for the hinge guide rail 202 being extended along a side surface of a backrest B12 of the seat B10 for the driver A10. The armrest 206 is equipped rotatably with the hinge 204 as the rotation axis. The position of the hinge 204 is fixed during the use of the armrest device 200, but is adjustable along the hinge guide rail 202. The armrest 206 is hollow, and the air supplied from the blowing/sucking device 104 is sent to the inside of the armrest 206 via the hinge 204. Hereby, the air pressure inside the armrest 206 is maintained at a level capable of supporting an arm of the driver A10.

The forward end of the armrest 206 and the upper end of the armrest pillar 208 are coupled to each other. The armrest pillar 208 is hollow, and the inside of the armrest pillar 208 and the inside of the armrest 206 are communicated with each other. Therefore, the air sent to the armrest 206 is supplied to the armrest pillar 208, and the air pressure inside the armrest pillar 208 is kept at a level capable of supporting an arm of the driver A10. The armrest pillar 208 is equipped so as to be freely expanded or contracted, and is expanded or contracted by the armrest pillar expansion/contraction device 210.

Figure 3:
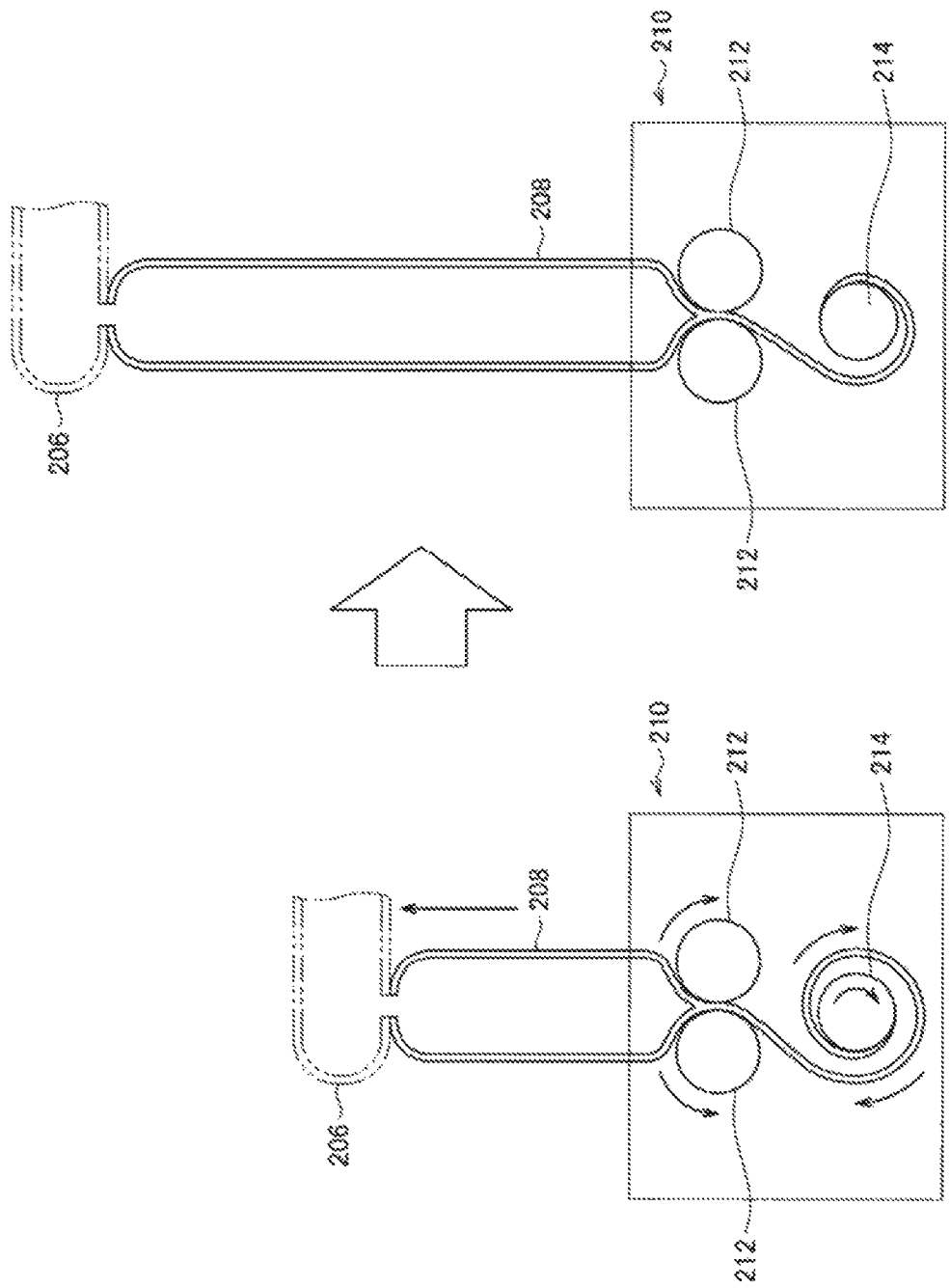
FIG. 3 is an explanatory view illustrating an example of a configuration of an armrest pillar expansion/contraction device of the armrest device according to the implementation.

FIG. 3 is an explanatory view illustrating an example of the configuration of the armrest pillar expansion/contraction device 210 according to the implementation. As illustrated in FIG. 3, the armrest pillar expansion/contraction device 210 includes a pair of non-driven rollers 212 and a driving roller 214.

A lower part of the armrest pillar 208 is interposed between the pair of non-driven rollers 212, and the side of the armrest pillar 208 lying lower than the non-driven rollers 212 is coupled to the driving roller 214. The rotation of the driving roller 214 adjusts an amount of the lower part of the armrest pillar 208 to be wound by the driving roller 214. Hereby, since the length of a part extending upward beyond the non-driven rollers 212 of the armrest pillar 208 is adjusted, the armrest 206 coupled to the armrest pillar 208 rotates with the hinge 204 as a rotation axis. Accordingly, the position of the armrest 206 is adjusted. For example, as illustrated in FIG. 3, when the driving roller 214 is rotated so that the amount of the lower part of the armrest pillar 208 to be wound decreases, the length of the part extending upward beyond the non-driven rollers 212 of the armrest pillar 208 becomes longer. Accordingly, the position of the armrest 206 can be raised. The driving roller 214 is driven on the basis of an operation instruction from the control device 400. The drive of the driving roller 214 is actualized, for example, with an electric motor.

Further, when the length of the part of the armrest pillar 208 extending upward beyond the non-driven rollers 212 becomes longer, the air is supplied to the inside of the armrest pillar 208 by the blowing/sucking device 104. On the other hand, when the length of the part of the armrest pillar 208 extending upward beyond the non-driven rollers 212 becomes shorter, the air is sucked from the inside of the armrest pillar 208 by the blowing/sucking device 104. Hereby, the air pressure inside the armrest 206 and the armrest pillar 208 is kept at a level capable of supporting an arm of the driver A10.

Figure 4:
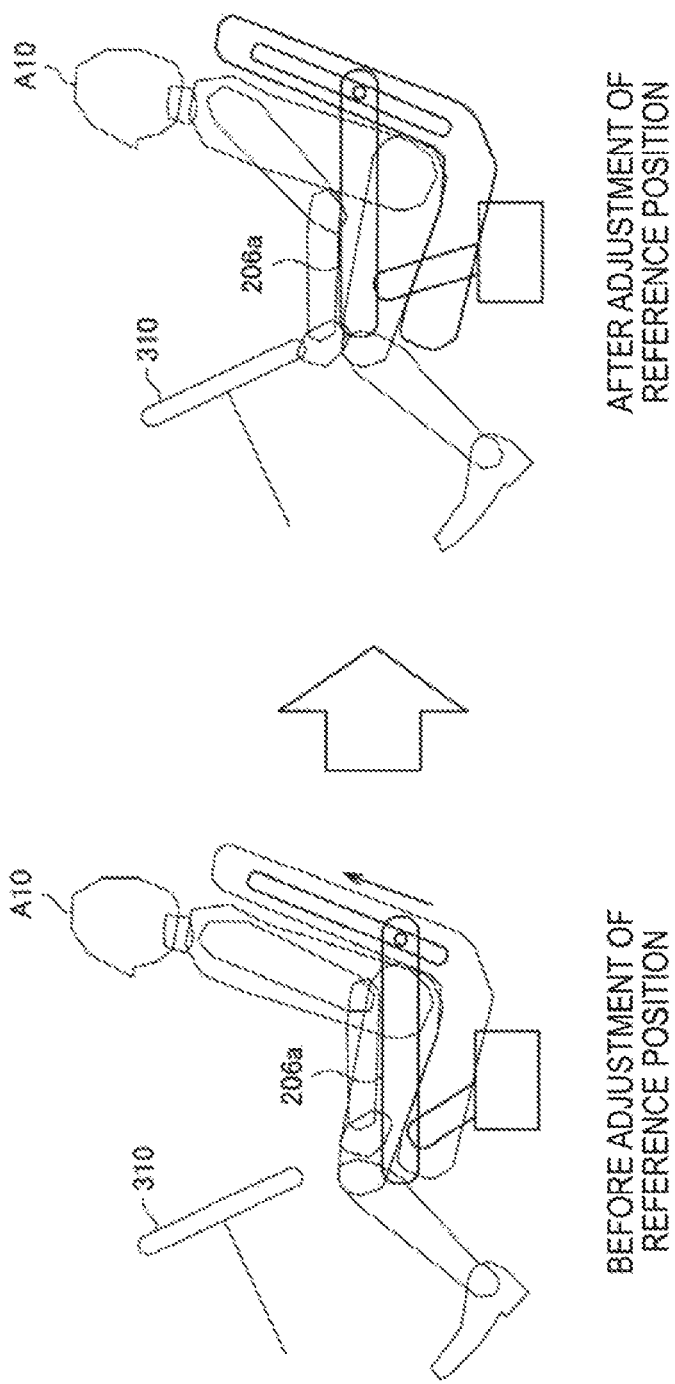
FIG. 4 is an explanatory view illustrating an example of adjustment of a reference position of the armrest of the armrest device according to the implementation.

FIG. 4 is an explanatory view illustrating an example of adjustment of the reference position of the armrest 206 according to the implementation. By adjusting the position of the hinge 204 along the hinge guide rail 202 and adjusting the expansion/contraction amount of the armrest pillar 208, the reference position of the armrest 206 may be adjusted. In FIG. 4, as one example, an example, in which a position of the armrest 206 corresponding to a comfortable posture set as the posture of the driver A10 in an automatic driving mode is adjusted as the reference position, is illustrated. Hereby, the reference position of the armrest 206 can be adjusted to an appropriate position in accordance with a body size of the driver A10 or the position of a steering. Hereinafter, the description of the armrest control system 10 according to the implementation will be continued, returning to FIG. 1.

The steering torque sensor 302 detects steering torque in steering operations of the driver A10, and outputs detection results to the control device 400.

The vehicle state sensor 304 detects various state quantities of the vehicle, and outputs detected results to the control device 400. Concretely, various state quantities of the vehicle detected by the vehicle state sensor 304 are state quantities for determining the driving mode of the vehicle. More concretely, various state quantities of the vehicle include a state quantity indicating a switching state of a switch (not illustrated) for switching the driving mode by the driver A10. Further, various state quantities of the vehicle include state quantities for use in an automatic driving control in the automatic driving mode. The state quantities for use in the automatic driving control may include, for example, at least one of state quantities indicating temperature, vehicle speed, yaw rate and a relative position of a lane to the vehicle.

The image pickup device 306 is configured, having an image sensor such as a CCD sensor or a CMOS sensor, and can take an image of the vehicle interior and detect objects on the image obtained by the image pickup processing. For example, the image pickup device 306 can detect positional relationship between objects around the driver A10 and the hand of the driver A10 as image information, on the basis of the obtained image. The information obtained by the image pickup device 306 is output to the control device 400.

The control device 400 is configured with a CPU (Central Processing Unit) being an arithmetic processing unit, a ROM (Read Only Memory) being a memory element storing programs, calculation parameters etc. that are used by the CPU, a RAM (Random Access Memory) being a memory element temporally storing programs that are used in execution of the CPU, parameters changing as appropriate in the execution etc., and the like.

The control device 400 controls motions of respective devices configuring the armrest control system 10. Concretely, the control device 400 performs operation instructions for respective actuators being control objects, using electric signals. More concretely, the control device 400 controls the drive of the blowing/sucking device 104, notification of various kinds of information to the driver A10 by the notification device 108 and the drive of the armrest pillar expansion/contraction device 210 of the armrest device 200. Further, the control device 400 receives information that is output from respective sensors. The control device 400 may communicate with respective sensors using CAN (Controller Area Network) communication. Meanwhile, functions owned by the control device 400 according to the implementation may be divided by plural control devices, and, on this occasion, the plural control devices may be coupled to each other via a communication bus such as CAN. Details of the control device 400 will be described later. The control device 400 and the blowing/sucking device 104 may be included in the armrest device 200.

2. CONFIGURATION OF CONTROL DEVICE

Figure 5:
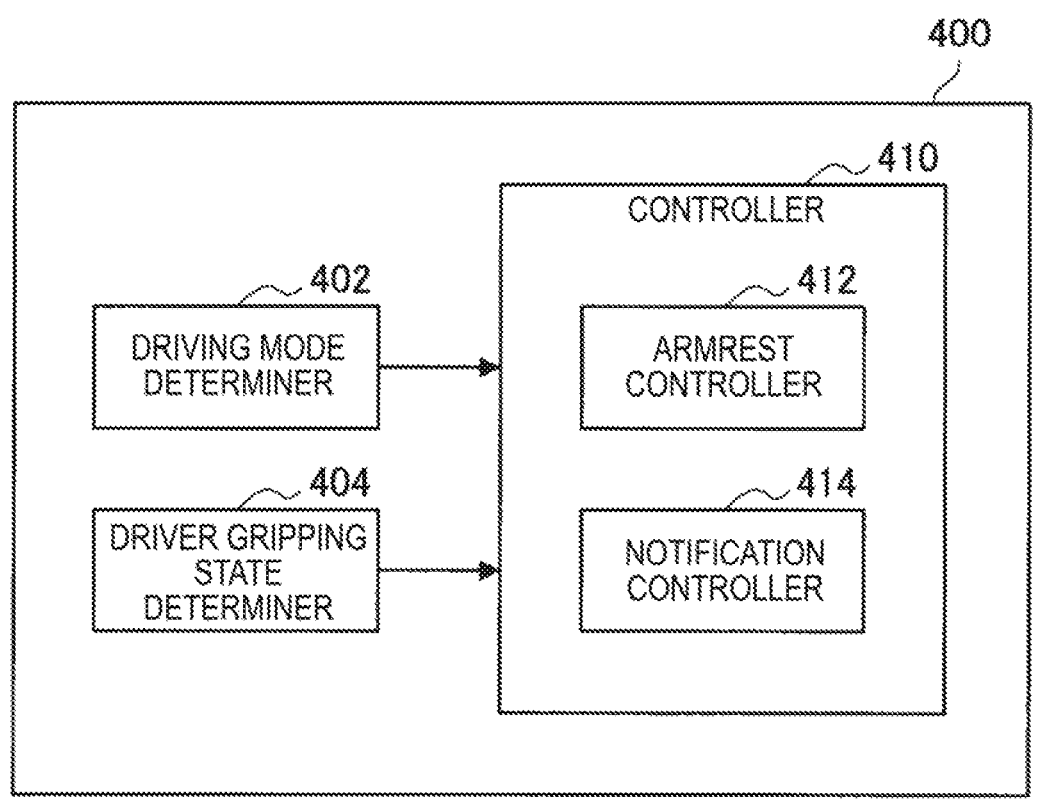
FIG. 5 is an explanatory view illustrating an example of a functional configuration of a control device according to the implementation.

Subsequently, with reference to FIG. 5, the functional configuration of the control device 400 according to the implementation will be described. FIG. 5 is an explanatory view illustrating an example of the functional configuration of the control device 400 according to the implementation. As illustrated in FIG. 5, the control device 400 includes a driving mode determiner 402, a driver gripping state determiner 404, and a controller 410.

(Driving Mode Determiner)

The driving mode determiner 402 determines the switching state of the driving mode of the vehicle, and outputs the determination result to the controller 410. Concretely, the driving mode determiner 402 determines whether the switching of the driving mode has started. The switching of the driving mode is performed in a switching transition period of around several seconds from the time point of the start of the switching of the driving mode to the time point of the completion of the switching.

The driving mode determiner 402 determines whether a switching of the driving mode of the vehicle has started on the basis of various state quantities that are output from the vehicle state sensor 304. For example, the driving mode determiner 402 may determine whether a switching of the driving mode of the vehicle has started on the basis of state quantities indicating the switching state of a switch for switching the driving mode by the driver A10. Concretely, the driving mode determiner 402 may determine, in a case where the driving mode of the vehicle is the manual driving mode, that a switching from the manual driving mode to the automatic driving mode has started when the driver A10 has shifted the switch for switching to the automatic driving mode. Further, the driving mode determiner 402 may determine, in a case where the driving mode of the vehicle is the automatic driving mode, that a switching from the automatic driving mode to the manual driving mode has started when the driver A10 has shifted the switch for switching to the manual driving mode.

The driving mode determiner 402 may determine whether a switching of the driving mode of the vehicle has started on the basis of state quantities such as temperature, vehicle speed, yaw rate and a relative position of a lane to the vehicle that are used for automatic driving control in the automatic driving mode. For example, in a case where the driving mode of the vehicle is the automatic driving mode, for example, when state quantities such as temperature, vehicle speed, yaw rate and a relative position of a lane to the vehicle give abnormal values or are not detected, a switching from the automatic driving mode to the manual driving mode is performed by a control device that performs an automatic driving control different from that of the control device 400.

Concretely, when a state quantity indicating a relative position of a lane to the vehicle cannot be detected because the lane cannot be recognized caused by unclearness of a lane line, a switching from the automatic driving mode to the manual driving mode may be performed by a control device that performs an automatic driving control. Further, when state quantities to be detected by the sensors are not detected due to malfunction of various sensors, a switching from the automatic driving mode to the manual driving mode may be performed by a control device that performs an automatic driving control. In such a case, the driving mode determiner 402 may determine that a switching from the automatic driving mode to the manual driving mode has started. Meanwhile, the control device that performs the automatic driving control and the control device 400 may be the same control device.

Further, the driving mode determiner 402, when determining that a switching from the automatic driving mode to the manual driving mode has started, may also determine whether the switching from the automatic driving mode to the manual driving mode has started in accordance with the input of the driver A10.

(Driver Gripping State Determiner)

The driver gripping state determiner 404 determines a gripping state of an object by the driver A10, and outputs the determination result to the controller 410. The driver gripping state determiner 404 determines a gripping state of an object by the driver A10, concretely, on the basis of information that is output from the image pickup device 306. For example, the driver gripping state determiner 404 may determine whether the driver A10 grips the steering wheel 310 on the basis of information that is output from the image pickup device 306. Concretely, the driver gripping state determiner 404 may determine whether the driver A10 grips the steering wheel 310 on the basis of positional relationship between the steering wheel 310 and a hand of the driver A10.

The driver gripping state determiner 404 may determine whether the driver A10 grips the steering wheel 310 on the basis of information indicating a steering torque, which is output from the steering torque sensor 302. Concretely, the driver gripping state determiner 404 may determine that the driver A10 grips the steering wheel 310 when the steering torque is larger than zero.

Further, when an electrostatic sensor is equipped for the steering wheel 310, the driver gripping state determiner 404 may determine whether the driver A10 grips the steering wheel 310 on the basis of change in capacitance detected by the electrostatic sensor. Concretely, the driver gripping state determiner 404 may determine that the driver A10 grips the steering wheel 310 when the change amount of the capacitance detected by the electrostatic sensor is larger than noise components.

The driver gripping state determiner 404 may determine whether the driver A10 grips an object different from the steering wheel 310 on the basis of information that is output from the image pickup device 306. For example, the driver gripping state determiner 404 may determine whether the driver A10 grips an object different from the steering wheel 310 on the basis of positional relationship between the object different from the steering wheel 310 and a hand of the driver A10. When it is determined that the driver A10 grips the object different from the steering wheel 310, additionally, the driver gripping state determiner 404 may determine whether the both hands of the driver A10 grip the object different from the steering wheel 310.

Further, when a weight sensor that detects the weight of the driver A10 is equipped for the vehicle, the driver gripping state determiner 404 may determine whether the driver A10 grips an object different from the steering wheel 310 on the basis of the weight detected by the weight sensor. It is considered that, when the driver A10 holds an object in a hand, the weight detected by the weight sensor changes in accordance with the weight of the object. Therefore, the driver gripping state determiner 404 may determine that the driver A10 grips an object different from the steering wheel 310 when the change amount of weight detected by the weight sensor is larger than noise components.

Meanwhile, various threshold values for use in the determination of a gripping state of an object by the driver A10, which is performed by the driver gripping state determiner 404, may be stored, for example, in a memory element of the control device 400.

(Controller)

The controller 410 includes an armrest controller 412 and a notification controller 414.

The armrest controller 412 controls a position of the supporter 206a of the armrest 206. Concretely, the armrest controller 412 controls a position of the supporter 206a as a result of controlling a position of the armrest 206 by outputting operation instructions to the armrest pillar expansion/contraction device 210 and the blowing/sucking device 104.

The armrest controller 412 controls a position of the supporter 206a of the armrest 206 on the basis of the determination result by the driving mode determiner 402. For example, the armrest controller 412 moves the supporter 206a of the armrest so that the supporter 206a approaches the steering wheel 310 when the driving mode determiner 402 determines that a switching from the automatic driving mode to the manual driving mode has started.

Further, the armrest controller 412 may control a position of the supporter 206a of the armrest 206 on the basis of the determination result by the driver gripping state determiner 404. For example, the armrest controller 412 may move the supporter 206a of the armrest 206 so that the supporter 206a recedes from the steering wheel 310 in a case where the driver gripping state determiner 404 determines that the driver A10 grips the steering wheel 310 when it is determined that a switching from the automatic driving mode to the manual driving mode has started.

The armrest controller 412 may keep a position of the supporter 206a of the armrest 206 in a case where the driver gripping state determiner 404 determines that the both hands of the driver A10 grip an object different from the steering wheel 310 when it is determined that a switching from the automatic driving mode to the manual driving mode has started.

In a case where the driver gripping state determiner 404 determines that one hand of the driver A10 grips an object different from the steering wheel 310 and the other hand does not grip an object different from the steering wheel 310 when it is determined that a switching from the automatic driving mode to the manual driving mode has started, the armrest controller 412 may move a part supporting the other hand in the supporter 206a of the armrest 206 so that the part approaches the steering wheel 310. For example, in the armrest control system 10, such a configuration may be adopted that the armrests 206 for the left arm and the right arm of the driver A10 are equipped on the left side and the light side of the seat B10 for the driver A10, respectively. In such a case, when the right hand of the driver A10 grips an object different from the steering wheel 310 and the left hand does not grip an object different from the steering wheel 310, the armrest controller 412 may move the supporter 206a of the armrest 206 for the left hand so that the supporter 206a approaches the steering wheel 310.

The armrest controller 412 may move the supporter 206a of the armrest 206 so that the supporter 206a recedes from the steering wheel 310 when the driving mode determiner 402 determines that a switching from the automatic driving mode to the manual driving mode has started in accordance with the input of the driver A10.

The armrest controller 412 may move the supporter 206a of the armrest 206 to a position corresponding to the posture set as the comfortable posture of the driver A10 in the automatic driving mode when the driving mode determiner 402 determines that a switching from the manual driving mode to the automatic driving mode has started.

Further, when the armrest control system 10 includes a sensor that detects force applied to the armrest 206 from the outside, the armrest controller 412 may keep the position of the supporter 206a of the armrest 206 when the force detected by the sensor is larger than a prescribed value. The prescribed value may be set as a value that makes it possible to determine whether the force detected by the sensor is larger than noise components. For example, during movement of the armrest 206, when the driver A10 intentionally tries to stop the motion of the armrest 206, or when clothing or the like of the driver A10 is caught in the armrest 206, or the like, breakage of devices or breakage of clothing etc. caused by continuation of the movement of the armrest 206 can be prevented.

The notification controller 414 controls notification of various kinds of information to the driver A10 by the notification device 108. Concretely, the notification controller 414 controls notification of various kinds of information to the driver A10 by the notification device 108 by outputting operation instructions to the notification device 108. The notification controller 414 controls notification of various kinds of information to the driver A10 on the basis of a determination result by the driving mode determiner 402 and a determination result by the driver gripping state determiner 404. For example, the notification controller 414 causes the notification device 108 to notify information indicating that a switching to the manual driving mode is being performed, in a case where the driver gripping state determiner 404 determines that the both hands of the driver A10 grip an object different from the steering wheel 310 when it is determined that a switching from the automatic driving mode to the manual driving mode has started.

3. MOTION

Subsequently, with reference to FIGS. 6 to 10, a flow of processing performed by the control device 400 according to the implementation will be described.
(Processing in Switching from Manual Driving Mode to Automatic Driving Mode)

Figure 6:
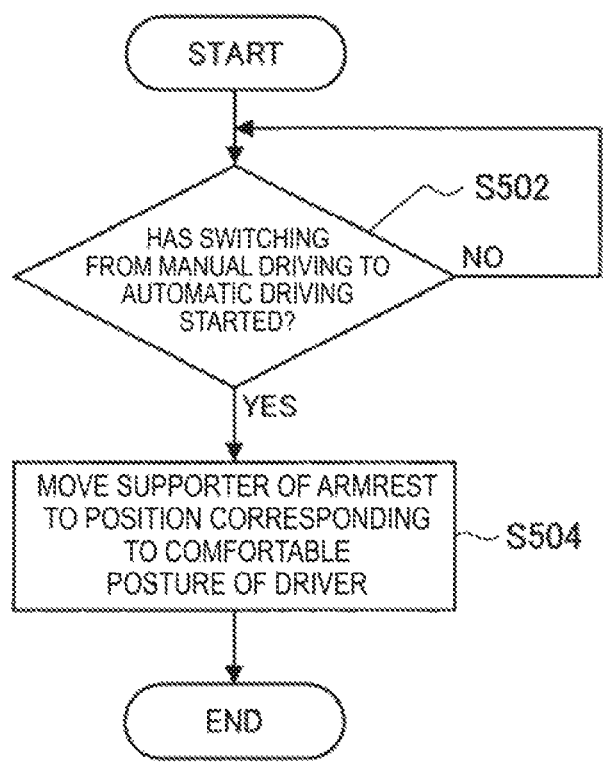
FIG. 6 is a flowchart illustrating an example of a flow of processing in a switching from a manual driving mode to an automatic driving mode performed by the control device according to the implementation.

FIG. 6 is a flowchart illustrating an example of a flow of processing in a switching from the manual driving mode to the automatic driving mode, performed by the control device 400 according to the implementation. As illustrated in FIG. 6, in the processing in the switching from the manual driving mode to the automatic driving mode, first, the driving mode determiner 402 determines whether the switching from the manual driving mode to the automatic driving mode has started (Step S502). When the driving mode determiner 402 does not determine that the switching from the manual driving mode to the automatic driving mode has started (Step S502/NO), the determination processing in Step S502 is repeated. On the other hand, when the driving mode determiner 402 determines that the switching from the manual driving mode to the automatic driving mode has started (Step S502/YES), the armrest controller 412 moves the supporter 206a of the armrest 206 to a position corresponding to the comfortable posture of the driver A10 (Step S504), and the processing illustrated in FIG. 6 ends.

Figure 7:
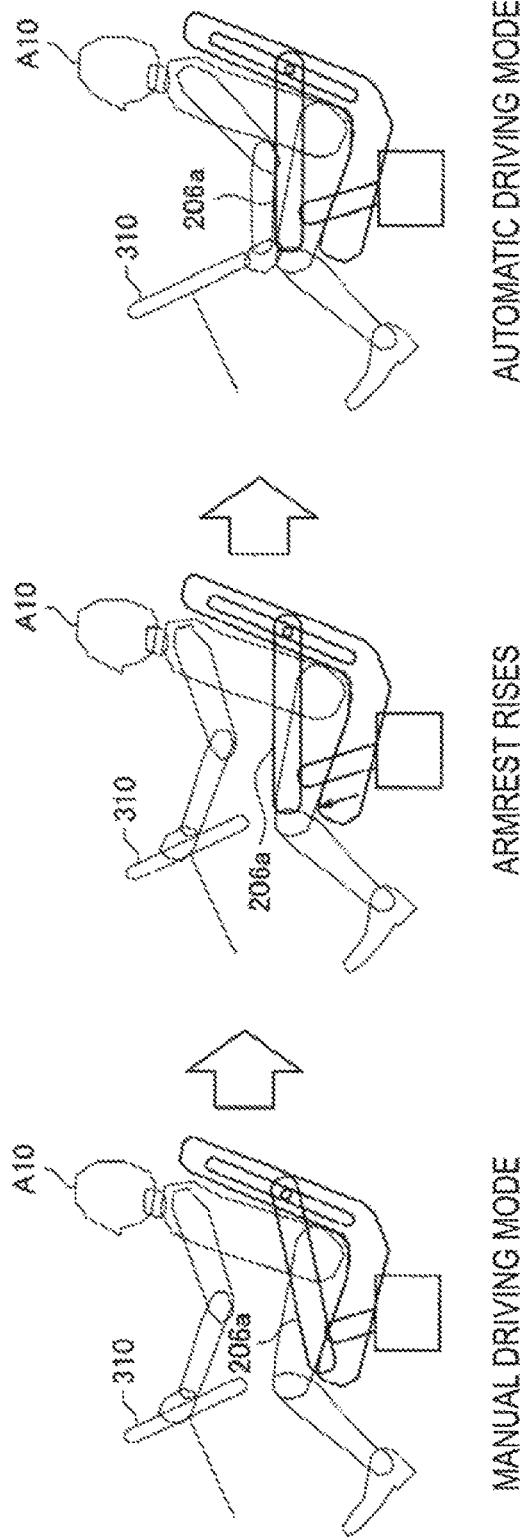
FIG. 7 is an explanatory view for explaining an example of position adjustment of an armrest by processing in a switching from the manual driving mode to the automatic driving mode performed by the control device according to the implementation.

FIG. 7 is an explanatory view for explaining an example of position adjustment of the armrest 206 by the processing in a switching from the manual driving mode to the automatic driving mode. As illustrated in FIG. 7, in the manual driving mode, the position of the armrest 206 has been adjusted to a position that does not disturb steering operations by the driver A10. Concretely, the position of the armrest 206 in the manual driving mode is set to a lower position as compared with the position of the armrest 206 corresponding to the comfortable posture of the driver A10 in the automatic driving mode. When the driving mode determiner 402 determines that a switching from the manual driving mode to the automatic driving mode has started, the position of the armrest 206 rises on the basis of an operation instruction from the armrest controller 412, and the supporter 206a of the armrest 206 is adjusted to the position corresponding to the comfortable posture of the driver A10 in the automatic driving mode. Hereby, in the automatic driving mode, the driver A10 can place the arm on the armrest 206 and take the comfortable posture.
(First Processing in Switching from Automatic Driving Mode to Manual Driving Mode)

Figure 8:
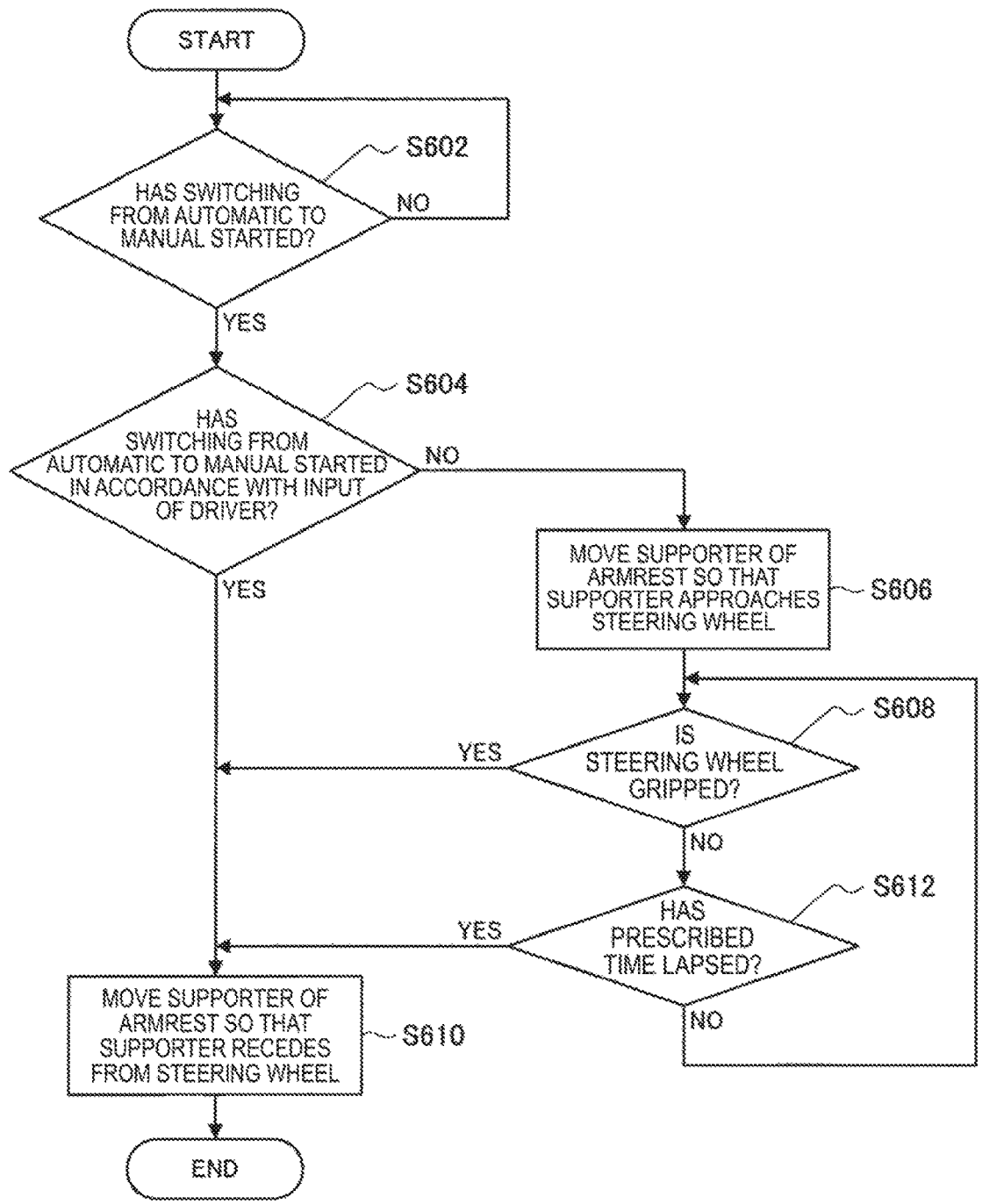
FIG. 8 is a flowchart illustrating an example of a flow of first processing in a switching from the automatic driving mode to the manual driving mode performed by the control device according to the implementation.

FIG. 8 is a flowchart illustrating an example of a flow of first processing in a switching from the automatic driving mode to the manual driving mode, performed by the control device 400 according to the implementation. As illustrated in FIG. 8, in the first processing in a switching from the automatic driving mode to the manual driving mode, first, the driving mode determiner 402 determines whether the switching from the automatic driving mode to the manual driving mode has started (Step S602). When the driving mode determiner 402 does not determine that a switching from the automatic driving mode to the manual driving mode has started (Step S602/NO), the determination processing in Step S602 is repeated. On the other hand, when the driving mode determiner 402 determines that a switching from the automatic driving mode to the manual driving mode has started (Step S602/YES), the driving mode determiner 402 determines whether the switching from the automatic driving mode to the manual driving mode has started in accordance with the input of the driver A10 (Step S604).

When the driving mode determiner 402 does not determine that a switching from the automatic driving mode to the manual driving mode has started in accordance with the input of the driver A10 (Step S604/NO), the armrest controller 412 moves the supporter 206a of the armrest 206 so that the supporter 206a approaches the steering wheel 310 (Step S606). Next, the driver gripping state determiner 404 determines whether the driver A10 grips the steering wheel 310 (Step S608). When the driver gripping state determiner 404 determines that the driver A10 grips the steering wheel 310 (Step S608/YES), the armrest controller 412 moves the supporter 206a of the armrest 206 so that the supporter 206a recedes from the steering wheel 310 (Step S610), and the processing illustrated in FIG. 8 ends.

Figure 9:
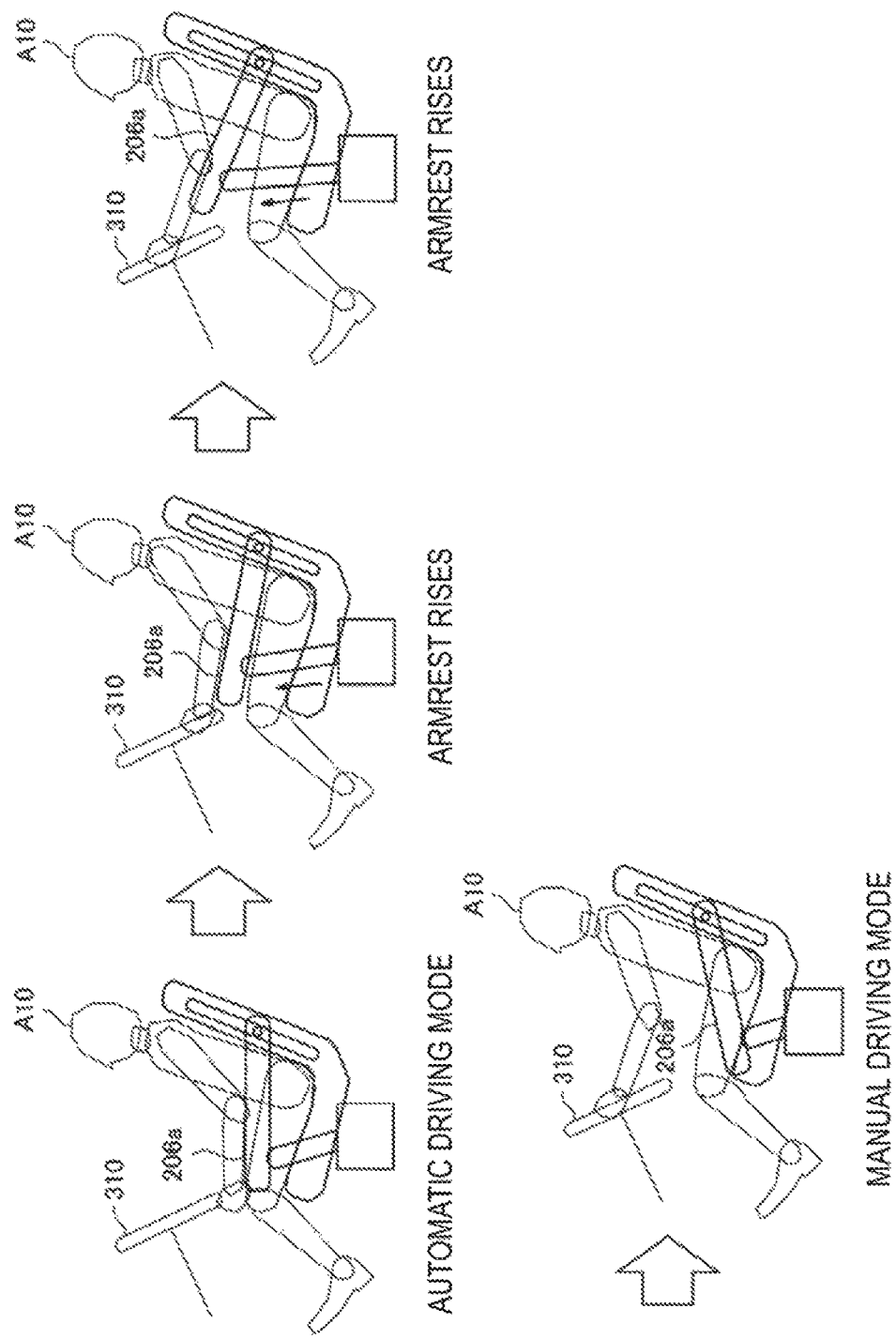
FIG. 9 is an explanatory view for explaining an example of position adjustment of the armrest by the first processing in a switching from the automatic driving mode to the manual driving mode performed by the control device according to the implementation.

FIG. 9 is an explanatory view for explaining an example of position adjustment of the armrest 206 by the first processing in a switching from the automatic driving mode to the manual driving mode when the switching from the automatic driving mode to the manual driving mode has started automatically. When the switching from the automatic driving mode to the manual driving mode has started automatically, in the determination processing in Step S604 illustrated in FIG. 8, the driving mode determiner 402 does not determine that the switching from the automatic driving mode to the manual driving mode has started in accordance with the input of the driver A10 (Step S604/NO).

As illustrated in FIG. 9, in the automatic driving mode, a position of the armrest 206 has been adjusted to the position corresponding to the comfortable posture of the driver A10. In the determination processing in Step S604 illustrated in FIG. 8, when it is not determined that a switching from the automatic driving mode to the manual driving mode has started in accordance with the input of the driver A10, the armrest 206 rises so that the supporter 206a approaches the steering wheel 310 on the basis of an operation instruction. Hereby, an arm of the driver A10 supported on the armrest 206 can be guided to a position in which the arm may grip the steering wheel 310. Accordingly, in a period of the switching from the automatic driving mode to the manual driving mode, the grip of the steering wheel 310 by the driver A10 can be prompted.

Next, when the steering wheel 310 is gripped by the driver A10, the driver gripping state determiner 404 determines that the driver A10 grips the steering wheel 310. Then, the armrest 206 descends so that the supporter 206a of the armrest 206 recedes from the steering wheel 310, and the position of the armrest 206 is adjusted to a position that does not disturb steering operations by the driver A10. Hereby, in the manual driving mode, disturbance of steering operations by the driver A10 caused by the armrest 206 can be prevented.

As illustrated in FIG. 8, in the determination processing in Step S608, when the driver gripping state determiner 404 does not determine that the driver A10 grips the steering wheel 310 (Step S608/NO), the driver gripping state determiner 404 determines whether a prescribed time has lapsed (Step S612). Here, the prescribed time is, for example, time set as transition time of a switching from the automatic driving mode to the manual driving mode. When the driver gripping state determiner 404 determines that the prescribed time has lapsed (Step S612/YES), the armrest controller 412 moves the supporter 206a of the armrest 206 so that the supporter 206a recedes from the steering wheel 310 (Step S610), and the processing illustrated in FIG. 8 ends. Hereby, even in a case where it is not determined that the driver A10 grips the steering wheel 310, in the manual driving mode, the position of the armrest 206 can be adjusted to a position that does not disturb steering operations of the driver A10. On the other hand, when the driver gripping state determiner 404 does not determine that the prescribed time has lapsed (Step S612/NO), the procedure returns to the determination processing in Step S608.

Further, in the determination processing in Step S604, when the driving mode determiner 402 determines that the switching from the automatic driving mode to the manual driving mode has started in accordance with the input of the driver A10 (Step S604/YES), the armrest controller 412 adjusts the position of the armrest 206 to a position that does not disturb steering operations by the driver A10 (Step S610) by moving the supporter 206a of the armrest 206 so that the supporter 206a recedes from the steering wheel 310, and the processing illustrated in FIG. 8 ends.

FIG. 10 is an explanatory view for explaining an example of position adjustment of the armrest 206 by the first processing in a switching from the automatic driving mode to the manual driving mode when the switching from the automatic driving mode to the manual driving mode has started in accordance with the input of the driver A10. As illustrated in FIG. 10, in the automatic driving mode, a position of the armrest 206 is adjusted to the position corresponding to the comfortable posture of the driver A10. When the switching from the automatic driving mode to the manual driving mode has started in accordance with the input of the driver A10, it is considered that the driver A10 has recognition that the switching from the automatic driving mode to the manual driving mode is being performed. Therefore, control of raising the armrest 206 for prompting grip of the steering wheel 310 can be omitted. Accordingly, in such a case, as illustrated in FIG. 10, the armrest 206 descends so that the supporter 206a recedes from the steering wheel 310 on the basis of an operation instruction, and the position of the armrest 206 is adjusted to a position that does not disturb steering operations by the driver A10 in the manual driving mode.

(Second Processing in Switching from Automatic Driving Mode to Manual Driving Mode)

Figure 11:
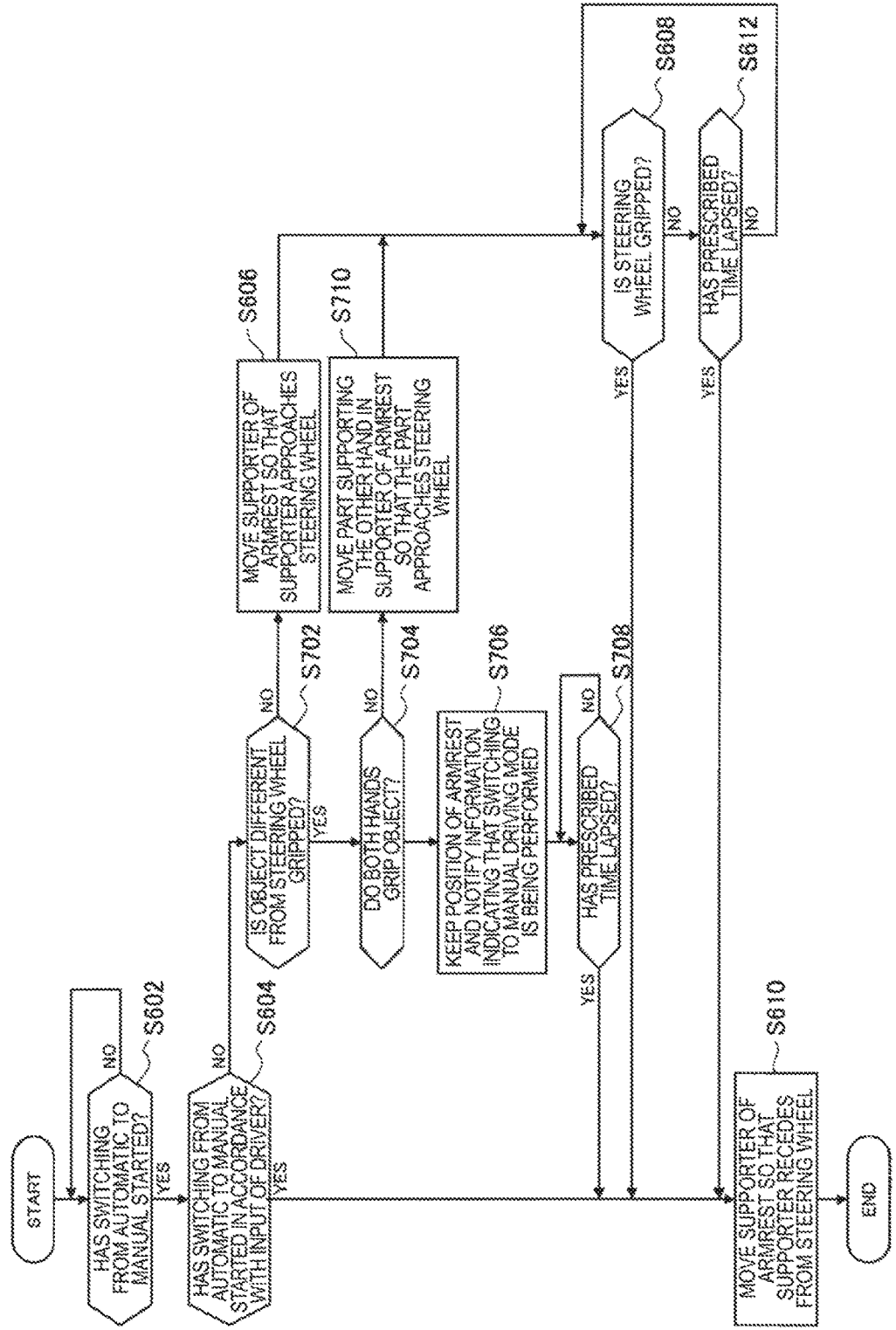
FIG. 11 is a flowchart illustrating an example of a flow of second processing in a switching from the automatic driving mode to the manual driving mode performed by the control device according to the implementation.

FIG. 11 is a flowchart illustrating an example of a flow of second processing in a switching from the automatic driving mode to the manual driving mode, which is performed by the control device 400 according to the implementation. As illustrated in FIG. 11, in the second processing in the switching from the automatic driving mode to the manual driving mode, when compared with the first processing described with reference to FIG. 8, points that determination of whether the driver A10 grips an object different from the steering wheel 310 and control of the armrest 206 based on the result of the determination are performed are different.

As illustrated in FIG. 11, in the second processing, when it is not determined that the switching from the automatic driving mode to the manual driving mode has started in accordance with the input of the driver A10 in the determination processing in Step S604 (Step S604/NO), the driver gripping state determiner 404 determines whether the driver A10 grips an object different from the steering wheel 310 (Step S702). When the driver gripping state determiner 404 does not determine that the driver A10 grips an object different from the steering wheel 310 (Step S702/NO), the procedure proceeds to the processing in Step S606. On the other hand, when the driver gripping state determiner 404 determines that the driver A10 grips an object different from the steering wheel 310 (Step S702/YES), the driver gripping state determiner 404 determines whether the both hands of the driver A10 grip an object different from the steering wheel 310 (Step S704).

When the driver gripping state determiner 404 determines that the both hands of the driver A10 grip the object (Step S704/YES), the armrest controller 412 keeps the position of the supporter 206a of the armrest 206, and the notification controller 414 causes the notification device 108 to notify information indicating that a switching to the manual driving mode is being performed (Step S706). When it is determined that the both hands of the driver A10 grip objects different from the steering wheel 310, there is a case that the driver A10 cannot grip the steering wheel 310. Further, in such a case, if control to move the supporter 206a of the armrest 206 is performed, the object gripped by the driver A10 or an object contained in the object may fall. Therefore, the control to raise the armrest 206 for prompting the grip of the steering wheel 310 is not performed, but information indicating that a switching to the manual driving mode is being performed is notified. Hereby, it becomes possible to prompt the grip of the steering wheel 310 by the driver A10 while preventing the falling of the object gripped by the driver A10 or an object contained in the object.

Then, the armrest controller 412 determines whether a prescribed time has lapsed (Step S708). Here, the prescribed time is, for example, time set as transition time of a switching from the automatic driving mode to the manual driving mode. When the armrest controller 412 does not determine that the prescribed time has lapsed (Step S708/NO), the determination processing in Step S708 is repeated. On the other hand, when the armrest controller 412 determines that the prescribed time has lapsed (Step S708/YES), the armrest controller 412 moves the supporter 206a of the armrest 206 so that the supporter 206a recedes from the steering wheel 310 (Step S610), and the processing illustrated in FIG. 11 ends. Hereby, in the manual driving mode, disturbance of steering operations by the driver A10 caused by the armrest 206 can be prevented.

In the determination processing in Step S704, in a case where the driver gripping state determiner 404 does not determine that the both hands of the driver A10 grip the object (Step S704/YES), the case corresponds to a case in which it is determined that one hand of the driver A10 grips the object and the other hand does not grip the object. In such a case, the armrest controller 412 moves the part supporting the other hand not gripping the object in the supporter 206a of the armrest 206 so that the part approaches the steering wheel 310 (Step S710). Then, the procedure proceeds to the determination processing in Step S608. Hereby, even when one hand grips an object different from the steering wheel 310, the arm corresponding to the other hand of the driver A10 can be guided to a position in which the other hand can grip the steering wheel 310. Accordingly, in the period in which the switching from the automatic driving mode to the manual driving mode is being performed, the grip of the steering wheel 310 by the driver A10 can be prompted.

4. APPLICATION EXAMPLES 4-1. First Application Example

Subsequently, with reference to FIGS. 12 to 16, a first application example, in which forecast of whether steering wheel steering with an intention of the driver A10 will be performed and control of the armrest based on the result of the forecast are performed, will be described.

Figure 12:
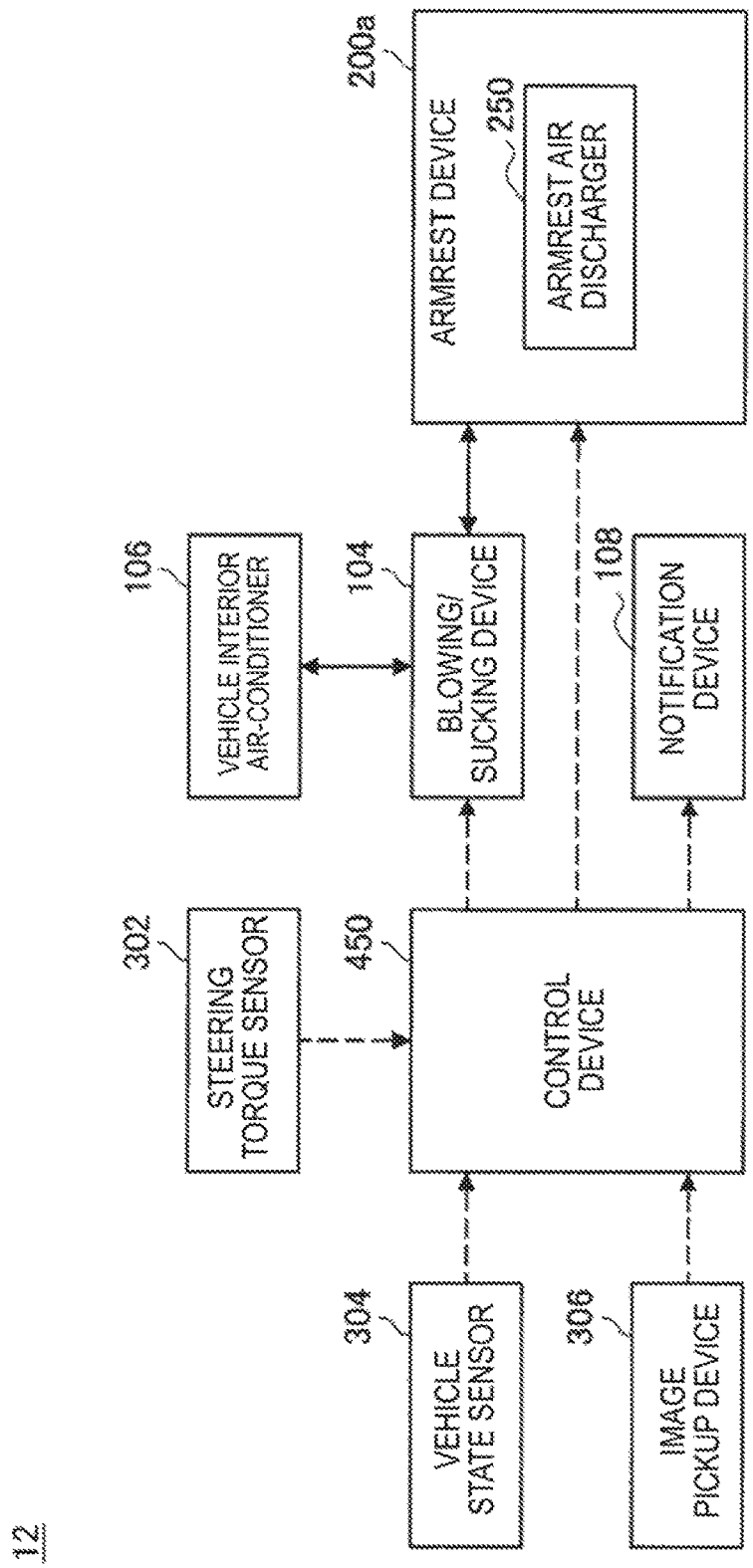
FIG. 12 is a schematic view illustrating an example of a rough configuration of an armrest control system according to a first application example.

FIG. 12 is a schematic view illustrating an example of a rough configuration of an armrest control system 12 according to the first application example. As illustrated in FIG. 12, as compared with the armrest control system 10 described with reference to FIG. 1, the armrest control system 12 according to the first application example is different in that an armrest air discharger 250 is equipped for the armrest device 200a.

The armrest air discharger 250 may discharge the air encapsulated inside the armrest 206 to the outside. The discharge of the air inside the armrest 206 by the armrest air discharger 250 is controlled by a control device 450. When the air inside the armrest 206 is discharged, the armrest 206 contracts.

Figure 13:
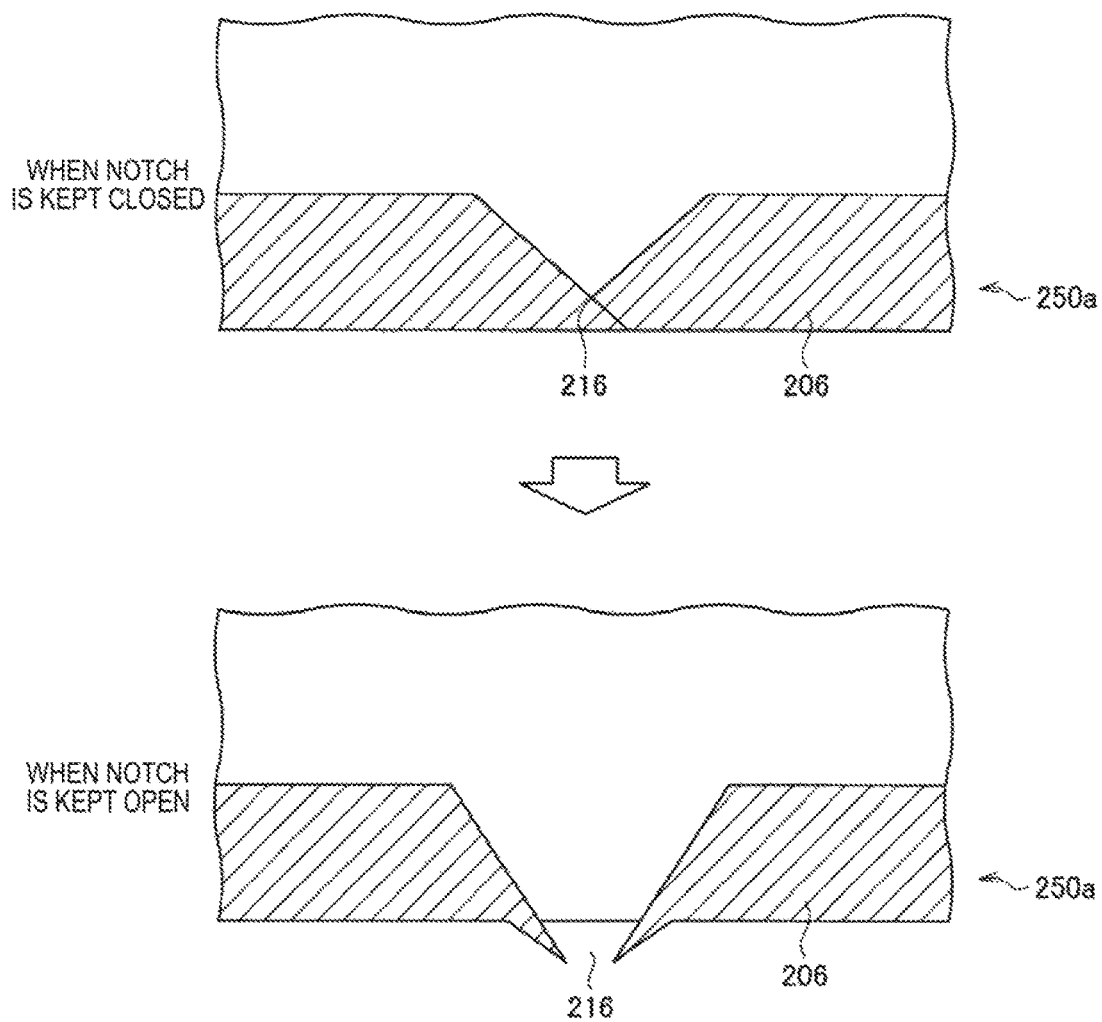
FIG. 13 is an explanatory view illustrating an example of a configuration of an armrest air discharger according to the first application example.

FIG. 13 is an explanatory view illustrating an example of the configuration of an armrest air discharger 250a according to the first application example. As illustrated in FIG. 13, for example, the armrest air discharger 250a includes a notch 216 equipped so that the inside and the outside of the armrest 206 may be communicated with each other. The notch 216 is kept closed when the air pressure inside the armrest 206 is lower than a prescribed pressure. On the other hand, it is so configured that, when the air pressure inside the armrest 206 becomes higher than the prescribed pressure, the notch 216 is opened. For example, the air pressure inside the armrest 206 may rise by causing the driving roller 214 illustrated in FIG. 3 to wind the lower end of the armrest pillar 208 in a state where suction of the air from the armrest device 200 by the blowing/sucking device 104 is not performed. Then, when the air pressure inside the armrest 206 becomes higher than the prescribed pressure, the notch 216 is opened. Hereby, the armrest 206 contracts. The prescribed pressure is set to a pressure that is higher than pressure capable of supporting an arm of the driver A10, which is an air pressure inside the armrest 206 being kept in normal times when it is not forecast that steering wheel steering with intention of the driver A10 will be performed, and a pressure that can be reached by the driving force of the driving roller 214.

Figure 14:
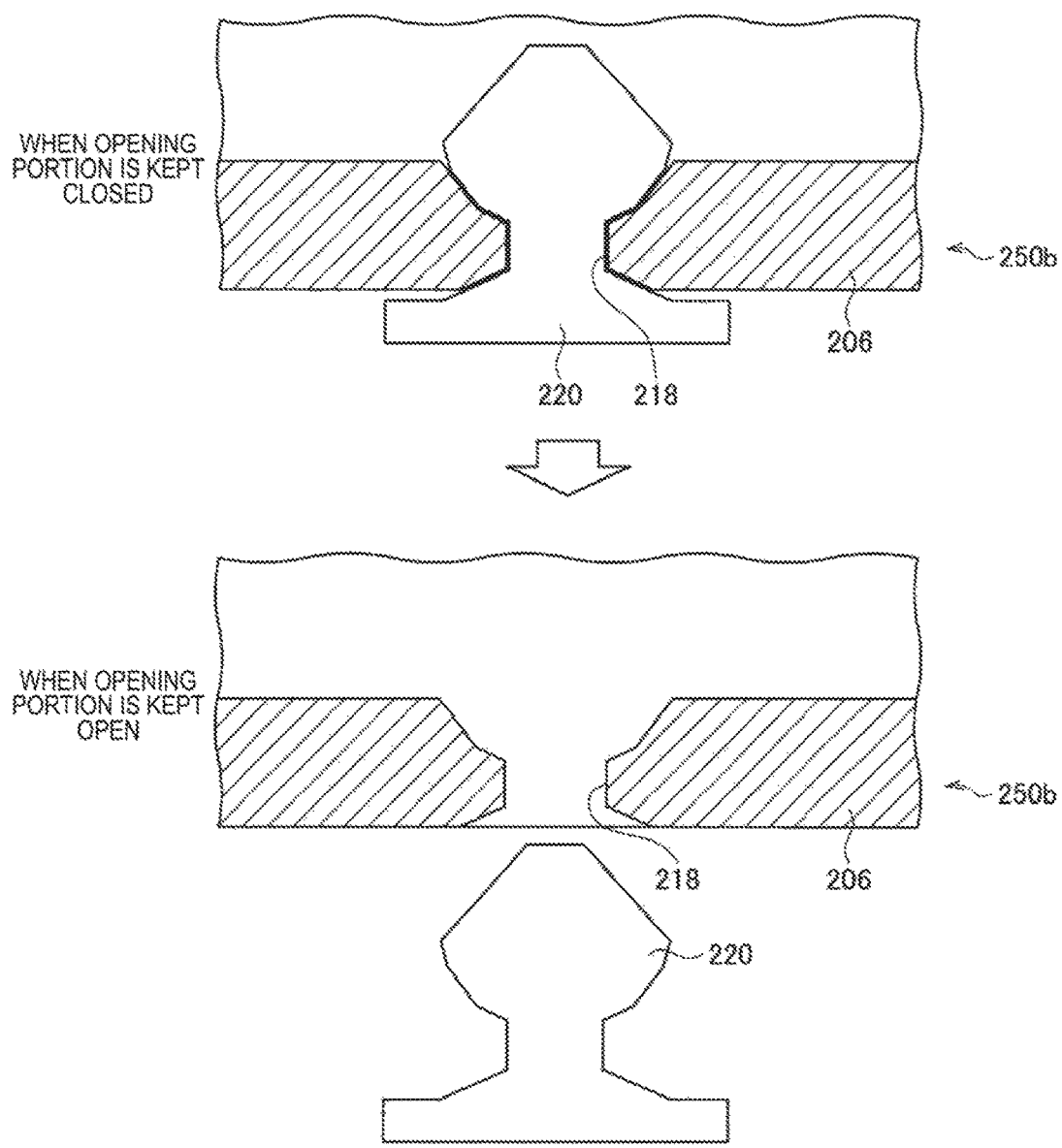
FIG. 14 is an explanatory view illustrating another example of a configuration of the armrest air discharger according to the first application example.

FIG. 14 is an explanatory view illustrating an example of the configuration of an armrest air discharger 250b according to another example. As illustrated in FIG. 14, for example, the armrest air discharger 250b includes an opening portion 218 equipped for a part of the armrest 206, and a cap 220. The opening portion 218 is kept closed with the cap 220 when the air pressure inside the armrest 206 is lower than the prescribed pressure. On the other hand, it is so configured that, when the air pressure inside the armrest 206 becomes higher than the prescribed pressure, the cap 220 is released outward and the opening portion 218 is opened. For example, the air pressure inside the armrest 206 may rise by causing the driving roller 214 illustrated in FIG. 3 to wind the lower end of the armrest pillar 208 in a state where suction of the air from the armrest device 200 by the blowing/sucking device 104 is not performed. Then, when the air pressure inside the armrest 206 becomes higher than the prescribed pressure, the cap 220 is released outward and the opening portion 218 is opened. Hereby, the armrest 206 contracts.

Figure 15:
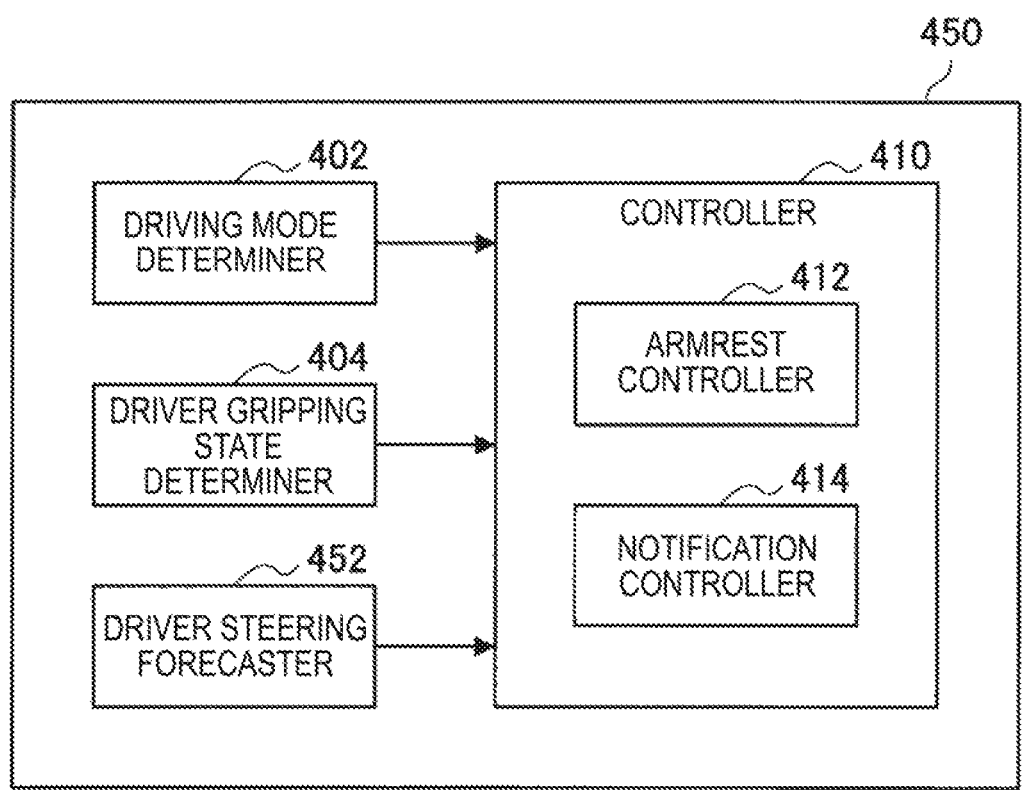
FIG. 15 is an explanatory view illustrating an example of a functional configuration of a control device according to the first application example.

FIG. 15 is an explanatory view illustrating an example of the functional configuration of the control device 450 according to the first application example. As illustrated in FIG. 15, as compared with the control device 400 described with reference to FIG. 5, the control device 450 according to the first application example is different in that it is equipped with a driver steering forecaster 452.

The driver steering forecaster 452 forecasts whether a prescribed steering by the driver A10 will be performed. Concretely, the driver steering forecaster 452 may forecast whether a prescribed steering by the driver A10 will be performed on the basis of information indicating a steering torque that is output from the steering torque sensor 302. The prescribed steering is a steering wheel steering with an intention of the driver A10, and it is considered that chances of steering wheel steering with a large operation amount are high when forecast that such a steering wheel steering will be performed is done. For example, the driver steering forecaster 452 may forecast that the prescribed steering by the driver A10 will be performed when the steering torque having been output from the steering torque sensor 302 exceeds a prescribed threshold value. The prescribed threshold value is set to a value capable of forecasting whether the steering wheel steering having a large operation amount with an intention of the driver A10 will be performed.

Further, when a steering angular speed sensor detecting a steering angular speed of the steering wheel 310 is equipped for the vehicle, the driver steering forecaster 452 may forecast whether the prescribed steering by the driver A10 will be performed on the basis of the steering angular speed detected by the steering angular speed sensor. For example, the driver steering forecaster 452 may forecast that the prescribed steering by the driver A10 will be performed when the steering angular speed detected by the steering angular speed sensor exceeds the prescribed threshold value. The prescribed threshold value is set to a value capable of forecasting whether the steering wheel steering having a large operation amount with the intention of the driver A10 will be performed.

Meanwhile, various threshold values for use in forecasting whether the prescribed steering by the driver A10 will be performed, which is performed by the driver steering forecaster 452, may be stored, for example, in the memory element of the control device 400.

The armrest controller 412 moves the supporter 206a of the armrest 206 so that the supporter 206a recedes from the steering wheel 310 by contracting the armrest 206 when the driver steering forecaster 452 forecasts that the prescribed steering by the driver A10 will be performed. Concretely, the armrest controller 412 drives the driving roller 214 so that the lower end of the armrest pillar 208 is wound without causing the blowing/sucking device 104 to suck the air from the armrest device 200 when the driver steering forecaster 452 forecasts that the prescribed steering by the driver A10 will be performed. Hereby, the air inside the armrest 206 is discharged outward by the armrest air discharger 250, and the armrest 206 contracts.

Figure 16:
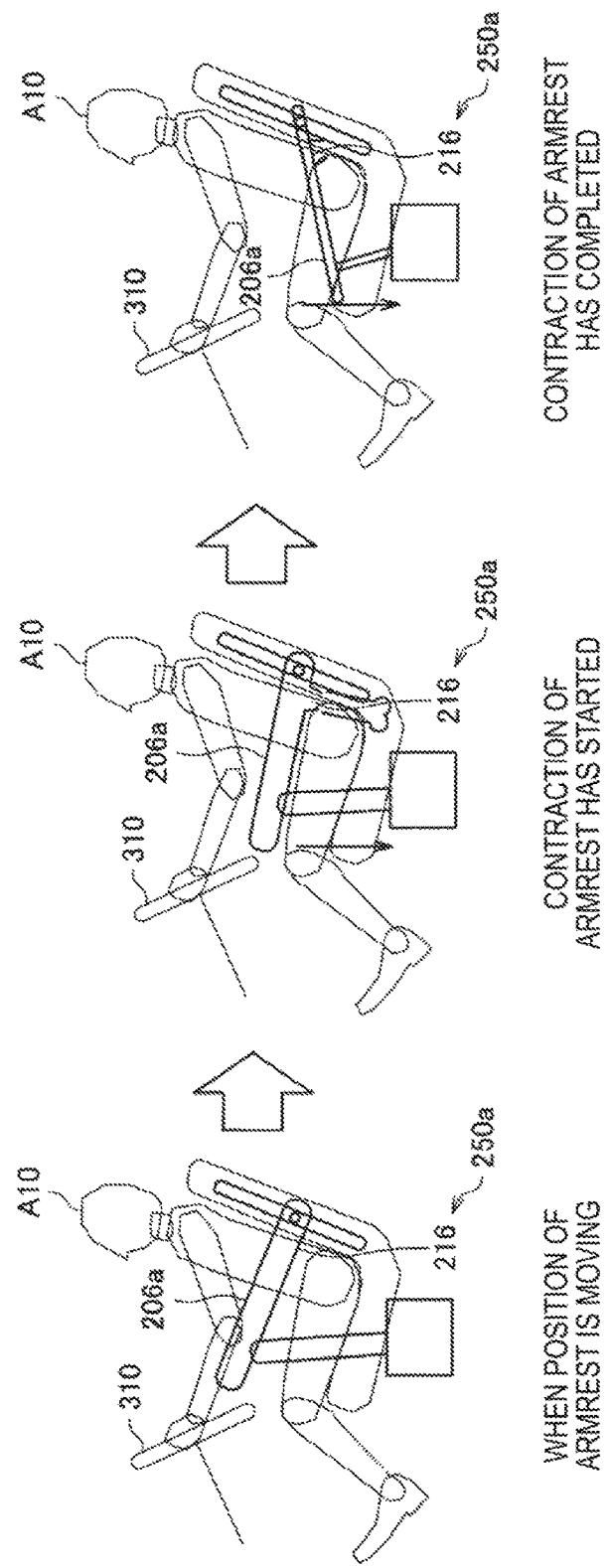
FIG. 16 is an explanatory view for explaining an example of position adjustment of an armrest by processing of the control device according to the first application example.

FIG. 16 is an explanatory view for explaining an example of position adjustment of the armrest 206 by processing of the control device 450 according to the first application example. In FIG. 16, an example, in which the armrest air discharger 250a described with reference to FIG. 13 is equipped on the back end side of the lower part of the armrest 206, is illustrated. As illustrated in FIG. 16, in a state where the position of the armrest 206 is moving, when the driver steering forecaster 452 forecasts that the prescribed steering by the driver A10 will be performed, the armrest controller 412 contracts the armrest 206. Hereby, the armrest 206 descends rapidly, and the position of the armrest 206 is adjusted rapidly to a position that does not disturb steering operations by the driver A10. Therefore, when chances that steering wheel steering having a large operation amount with the intension of the driver A10 is performed are high, disturbance of steering operations by the driver A10 caused by the armrest 206 can be prevented rapidly.

A forecast of whether the prescribed operation by the driver A10 will be performed, which is done by the control device 450 according to the first application example, and the control of the armrest based on the result of the forecast may be performed, for example, in the rise of the armrest 206 described with reference to FIG. 7 or FIG. 9. Further, the forecast and the control of the armrest based on the result of the forecast may be performed in the descent of the armrest 206 described with reference to FIG. 9 or FIG. 10.

Meanwhile, a mechanism that contracts the armrest 206 is not limited to the above-described example by the armrest air discharger 250. For example, a mechanism, in which the air inside the armrest 206 is discharged by making a hole in a part of the armrest 206 utilizing heat or shock generated by powder or dissolution by a chemical, may be applied. Moreover, when a fastener capable of communicating the inside and the outside of the armrest 206 is equipped in a part of the armrest 206, a mechanism, in which the air inside the armrest 206 is discharged by opening the fastener utilizing an electrically-operated actuator, may be applied.

4-2. Second Application Example

Subsequently, with reference to FIG. 17, a second application example, in which determination on whether an awakening degree of the driver A10 is in a deteriorated state and control of the armrest based on the result of the determination are performed, will be described.

Figure 17:
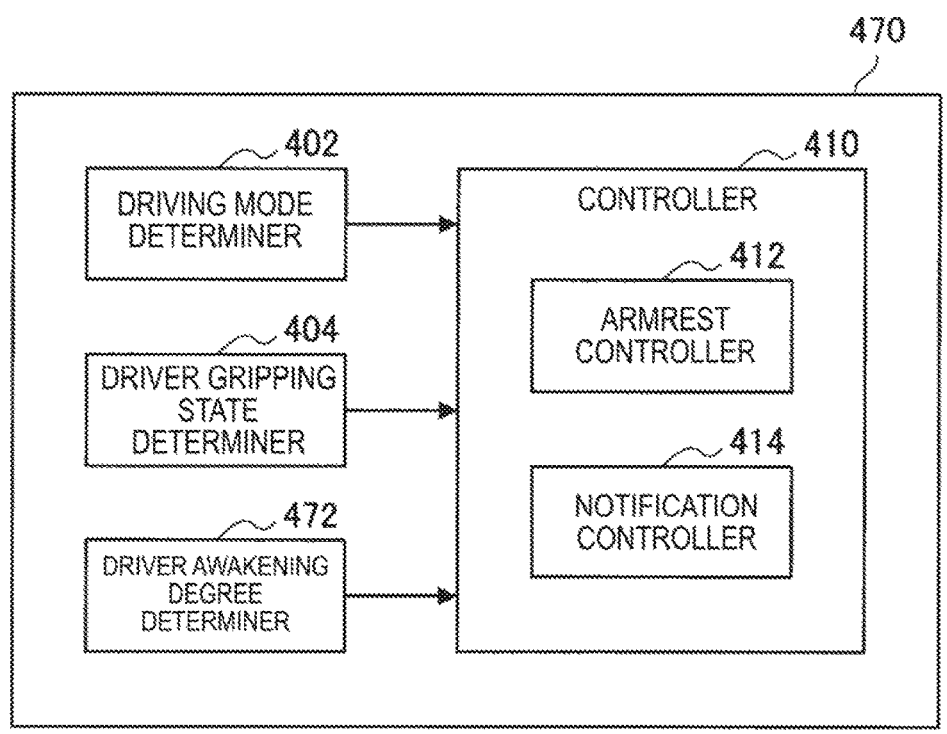
FIG. 17 is an explanatory view illustrating an example of a functional configuration of a control device according to a second application example.

FIG. 17 is an explanatory view illustrating an example of a functional configuration of a control device 470 according to the second application example. As illustrated in FIG. 17, the control device 470 according to the second application example is different, as compared with the control device 400 described with reference to FIG. 5, in that a driver awakening degree determiner 472 is equipped.

The driver awakening degree determiner 472 determines whether an awakening degree of the driver A10 is in a deteriorated state. Concretely, the driver awakening degree determiner 472 may determine whether an awakening degree of the driver A10 is in a deteriorated state on the basis of information that is output from the image pickup device 306. Here, the image pickup device 306 may be configured so that an awakening degree of the driver A10 can be recognized from an image of the face of the driver A10 obtained by image pickup processing. The driver awakening degree determiner 472 may determine whether an awakening degree of the driver A10 is in a deteriorated state on the basis of the awakening degree of the driver A10 recognized by the image pickup device 306. The deteriorated state is, concretely, a state in which the awakening degree of the driver A10 deteriorates to an extent that normal steering wheel steering cannot be performed.

When the driver awakening degree determiner 472 determines that the awakening degree of the driver A10 is in a deteriorated state, the armrest controller 412 reciprocates the supporter 206a of the armrest 206. For example, when the driver awakening degree determiner 472 determines that the awakening degree of the driver A10 is in a deteriorated state, the armrest controller 412 repeats an up-and-down motion of the supporter 206a of the armrest 206. Hereby, when an awakening degree of the driver A10 is in a deteriorated state, the awakening degree of the driver A10 can be raised.

5. CONCLUSION

As described hereinbefore, according to the implementation, the armrest controller 412 moves the supporter 206a, which supports an arm of the driver A10, of the armrest 206 so that the supporter 206a approaches the steering wheel 310 when the driving mode determiner 402 determines that a switching from the automatic driving mode to the manual driving mode has started. Hereby, an arm of the driver A10 supported by the armrest 206 can be guided to a position capable of gripping the steering wheel 310. Accordingly, in lapse of time in which the switching from the automatic driving mode to the manual driving mode is performed, the grip of the steering wheel 310 by the driver A10 can be prompted.

In the above, the example in which the position of the supporter 206a of the armrest 206 is controlled by controlling the position of the armrest 206 by the armrest controller 412 is described, but the technical scope of the present invention is not limited to the example. For example, the armrest 206 may be configured so as to freely swell and contract, and, in such a case, the position of the supporter 206a of the armrest 206 may be adjusted by swelling or contraction of the armrest 206. In such a case, it may be configured so that the position of the supporter 206a of the armrest 206 is controlled by the control of the swelling and the contraction of the armrest 206 by the armrest controller 412. Hereby, the same effect as that of the above-described implementation can be obtained.

Further, in the above, the example, in which the armrest 206 is hollow and the air pressure inside the armrest 206 is kept at a degree capable of supporting an arm of the driver A10, is described, but the technical scope of the present invention is not limited to the example. For example, it is sufficient that the armrest 206 may support an arm of the driver A10, and the armrest may be solid.

Furthermore, in the above, the example, in which the position of the armrest 206 is adjusted by expansion/contraction of the armrest pillar 208, is described, but the technical scope of the present invention is not limited to the example. For example, it may be configured so that the position of the armrest 206 is adjusted by driving of an electrically-operated actuator (not illustrated) coupled to the armrest 206.

Moreover, in the above, the example, in which the armrest 206 is equipped on the side of the seat B10 for the driver A10, is described, but the technical scope of the present invention is not limited to the example. For example, as illustrated in FIG. 18, an armrest 286 may be equipped on the front side or back side of the backrest B12 of the seat B10 for the driver A10. In such a case, in the manual driving mode, for example, at least a part of the armrest 286 is, as illustrated in FIG. 18, stored in the inside of the backrest B12 of the seat B10 for the driver A10. Further, when a switching from the manual driving mode to the automatic driving mode is performed, the armrest 286 moves so that a supporter 286a of the armrest 286 moves to the position corresponding to the comfortable posture of the driver A10. Then, in the automatic driving mode, the supporter 286a of the armrest 286 is adjusted, for example, as illustrated in FIG. 18, to the position corresponding to the comfortable posture of the driver A10.

In addition, as illustrated in FIG. 19, an armrest 296 may be equipped for a seat belt B14 that keeps the driver A10 to the seat B10 in driving. In such a case, in the manual driving mode, for example, the armrest 296 lies in a contracted state along the seat belt B14 as illustrated in FIG. 19. Further, when a switching from the manual driving mode to the automatic driving mode is performed, the armrest 296 swells so that a supporter 296a of the armrest 296 moves to the position corresponding to the comfortable posture of the driver A10. Then, in the automatic driving mode, for example, as illustrated in FIG. 19, the supporter 296a of the armrest 296 is adjusted to the position corresponding to the comfortable posture of the driver A10.

Additionally, in the first application example described with reference to FIGS. 13 and 14, the mechanism discharging the air inside the armrest 206 is described, but the effect the same as that of the first application example can also be obtained by applying a mechanism of causing the armrest 206 to fall off mechanically. For example, when the driver steering forecaster 452 forecasts that the prescribed steering by the driver A10 will be performed, by causing the armrest 206 to fall off mechanically from the seat B10 of the driver A10, disturbance of steering operations by the driver A10 caused by the armrest 206 can be prevented rapidly.

Moreover, in the present specification, processing's described using the flowchart may not necessarily be performed in the order indicated in the flowchart. Some processing steps may be executed in parallel. Further, an additional processing step may be adopted, and a part of processing steps may be omitted.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An armrest control device, comprising:
   a driving mode determiner that determines a switching state of a driving mode of a vehicle capable of switching between an automatic driving mode and a manual driving mode; and
   an armrest controller that moves a supporter of an armrest, which supports an arm of a driver, so that the supporter approaches a steering wheel, when the driving mode determiner determines that a switching from the automatic driving mode to the manual driving mode has started.

2. The armrest control device according to claim 1, comprising
   a driver gripping state determiner that determines a gripping state of an object by the driver, wherein
   the armrest controller moves the supporter so that the supporter recedes from the steering wheel, in a case where the driver gripping state determiner determines that the driver grips the steering wheel when it is determined that the switching from the automatic driving mode to the manual driving mode has started.

3. The armrest control device according to claim 2, comprising
   a notification controller that controls notification of various kinds of information to the driver by a notification device, wherein
   the armrest controller keeps a position of the supporter and the notification controller causes the notification device to notify information indicating that the switching to the manual driving mode is being performed, in a case where the driver gripping state determiner determines that both hands of the driver grip an object different from the steering wheel when it is determined that the switching from the automatic driving mode to the manual driving mode has started.

4. The armrest control device according to claim 3, wherein the armrest controller moves, in a case where the driver gripping state determiner determines that one hand of the driver grips an object different from the steering wheel and the other hand does not grip an object different from the steering wheel when it is determined that the switching from the automatic driving mode to the manual driving mode has started, a part supporting the other hand in the supporter so that the part approaches the steering wheel.

5. The armrest control device according to claim 2, wherein the armrest controller moves, in a case where the driver gripping state determiner determines that one hand of the driver grips an object different from the steering wheel and the other hand does not grip an object different from the steering wheel when it is determined that the switching from the automatic driving mode to the manual driving mode has started, a part supporting the other hand in the supporter so that the part approaches the steering wheel.

6. The armrest control device according to claim 2, wherein the armrest controller moves the supporter so that the supporter recedes from the steering wheel when the driving mode determiner determines that the switching from the automatic driving mode to the manual driving mode has started in accordance with input of the driver.

7. The armrest control device according to claim 2, comprising
   a driver steering forecaster that forecasts whether prescribed steering by the driver will be performed, wherein
   the armrest controller moves the supporter so that the supporter recedes from the steering wheel by contracting the armrest when the driver steering forecaster forecasts that the prescribed steering by the driver will be performed.

8. The armrest control device according to claim 2, comprising
   a driver awakening degree determiner that determines whether an awakening degree of the driver is in a deteriorated state, wherein
   the armrest controller reciprocates the supporter in a case where the driver awakening degree determiner determines that the awakening degree of the driver is in a deteriorated state.

9. The armrest control device according to claim 2, wherein the armrest controller moves the supporter to a position corresponding to a comfortable posture set as a posture of the driver in the automatic driving mode when the driving mode determiner determines that a switching from the manual driving mode to the automatic driving mode has started.

10. The armrest control device according to claim 1, wherein the armrest controller moves the supporter so that the supporter recedes from the steering wheel when the driving mode determiner determines that the switching from the automatic driving mode to the manual driving mode has started in accordance with input of the driver.

11. The armrest control device according to claim 1, comprising
   a driver steering forecaster that forecasts whether prescribed steering by the driver will be performed, wherein
   the armrest controller moves the supporter so that the supporter recedes from the steering wheel by contracting the armrest when the driver steering forecaster forecasts that the prescribed steering by the driver will be performed.

12. The armrest control device according to claim 1, comprising
 a driver awakening degree determiner that determines whether an awakening degree of the driver is in a deteriorated state, wherein
 the armrest controller reciprocates the supporter in a case where the driver awakening degree determiner determines that the awakening degree of the driver is in a deteriorated state.

13. The armrest control device according to claim 1, wherein the armrest controller moves the supporter to a position corresponding to a comfortable posture set as a posture of the driver in the automatic driving mode when the driving mode determiner determines that a switching from the manual driving mode to the automatic driving mode has started.

14. An armrest device, comprising:
 a control device that includes:
  a driving mode determiner that determines a switching state of a driving mode of a vehicle capable of switching between an automatic driving mode and a manual driving mode, and
  an armrest controller that moves a supporter of an armrest, which supports an arm of a driver, so that the supporter approaches a steering wheel when the driving mode determiner determines that a switching from the automatic driving mode to the manual driving mode has started; and
 an armrest in which a position of the supporter is adjusted on the basis of an operation instruction from the control device.

15. An armrest control device, comprising:
 circuitry configured to:
  determine a switching state of a driving mode of a vehicle capable of switching between an automatic driving mode and a manual driving mode; and
  move a supporter of an armrest, which supports an arm of a driver, so that the supporter approaches a steering wheel, when the circuitry determines that a switching from the automatic driving mode to the manual driving mode has started.

16. An armrest device, comprising:
 a control device that includes circuitry configured to:
  determine a switching state of a driving mode of a vehicle capable of switching between an automatic driving mode and a manual driving mode, and
  move a supporter of an armrest, which supports an arm of a driver, so that the supporter approaches a steering wheel when the circuitry determines that a switching from the automatic driving mode to the manual driving mode has started; and
 an armrest in which a position of the supporter is adjusted on the basis of an operation instruction from the control device.

* * * * *